(12) United States Patent
Hata et al.

(10) Patent No.: US 10,017,389 B2
(45) Date of Patent: Jul. 10, 2018

(54) CNT METAL COMPOSITE MATERIAL, AND METHOD FOR PRODUCING SAME

(71) Applicant: NATIONAL INSTITUTE OF ADVANCED INDUSTRIAL SCIENCE AND TECHNOLOGY, Tokyo (JP)

(72) Inventors: Kenji Hata, Ibaraki (JP); Takeo Yamada, Ibaraki (JP); Chandramouli Subramaniam, Ibaraki (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 134 days.

(21) Appl. No.: 15/003,881

(22) Filed: Jan. 22, 2016

(65) Prior Publication Data

US 2016/0137504 A1 May 19, 2016

Related U.S. Application Data

(63) Continuation of application No. PCT/JP2014/069357, filed on Jul. 22, 2014.

(30) Foreign Application Priority Data

Jul. 22, 2013 (JP) ................. 2013-151956

(51) Int. Cl.
*H01B 1/04* (2006.01)
*H01B 1/02* (2006.01)
(Continued)

(52) U.S. Cl.
CPC .......... *C01B 31/022* (2013.01); *C01B 32/158* (2017.08); *C25D 5/50* (2013.01);
(Continued)

(58) Field of Classification Search
CPC ... H01B 1/00; H01B 1/02; H01B 1/04; B82Y 30/00; B82Y 40/00; H01G 11/36
(Continued)

(56) References Cited

U.S. PATENT DOCUMENTS

2007/0036978 A1* 2/2007 Chen .................. B22F 7/08
428/408
2009/0277793 A1 11/2009 Ehira et al.
(Continued)

FOREIGN PATENT DOCUMENTS

CN 101976594 A * 2/2011 ............ H01B 1/02
JP 2001225406 A 8/2001
(Continued)

OTHER PUBLICATIONS

English Translation of the Written Opinion of the International Search Authority dated Oct. 21, 2014 for PCT Application No. PCT/JP2014/069357.
(Continued)

*Primary Examiner* — Tri V Nguyen
(74) *Attorney, Agent, or Firm* — Typha IP LLC

(57) ABSTRACT

A CNT metal composite material is provided depositing a metal into a plurality of CNTs is provided including 3% by weight or more and 70% by weight or less of the CNTs, a region is arranged with the metal uniformly distributed in a scanning electron microscope image magnified ten thousand times and the length of the region is at least 1 μm, a signal of the metal and a signal of carbon are not localized in a specific area in a two-dimensional elemental analysis image magnified ten thousand times, and a length of a region uniformly distributing the signal of the metal and the signal of carbon uniformly distributed is at least 1 μm, an allowable current density is at $6 \times 10^6$ A/cm$^2$ or more, and volume resistivity is $1 \times 10^{-6}$ Ω·cm or more and $5 \times 10^{-3}$ Ω·cm or less.

7 Claims, 25 Drawing Sheets

(51) Int. Cl.
*B82Y 30/00* (2011.01)
*C01B 31/02* (2006.01)
*C25D 5/50* (2006.01)
*C25D 5/54* (2006.01)
*C25D 15/00* (2006.01)
*C01B 32/158* (2017.01)

(52) U.S. Cl.
CPC ............... *C25D 5/54* (2013.01); *C25D 15/00* (2013.01); *H01B 1/04* (2013.01)

(58) Field of Classification Search
USPC .............................................. 252/182.1, 503
See application file for complete search history.

(56) References Cited

U.S. PATENT DOCUMENTS

| | | | |
|---|---|---|---|
| 2011/0008617 A1 | 1/2011 | Hata et al. | |
| 2012/0121986 A1* | 5/2012 | Balu | B82Y 30/00 429/231.1 |
| 2013/0243974 A1* | 9/2013 | Jung | C23C 18/1639 427/560 |
| 2013/0299212 A1* | 11/2013 | Hata | B82Y 30/00 174/126.2 |

FOREIGN PATENT DOCUMENTS

| | | | | |
|---|---|---|---|---|
| JP | 2005277096 A | | 10/2005 | |
| JP | 2005320579 A | | 11/2005 | |
| JP | 2007009333 A | | 1/2007 | |
| JP | 2007070689 A | | 3/2007 | |
| JP | 2008056950 A | * | 3/2008 | ............ C22C 49/02 |
| JP | 2008056950 A | | 3/2008 | |
| WO | 2010076885 A1 | | 7/2010 | |
| WO | 2011148977 A1 | | 12/2011 | |
| WO | WO2012091139 | * | 5/2012 | ............ H01B 1/00 |
| WO | 2012091139 A1 | | 7/2012 | |

OTHER PUBLICATIONS

Yang, Y.L., "Single-walled carbon nanotube-reienforced copper composite coatings prepared by electrodeposition under ultrasonic field" Materials Letters, Apr. 27, 2007, pp. 1, 47-50, vol. 62, (Elsevier Online article).
International Search Report dated Oct. 21, 2014 for PCT Application No. PCT/JP2014/069357.
Written Opinion of the International Search Authority dated Oct. 21, 2014 for the PCT application No. PCT/JP2014/069357.
International Preliminary Search Examination Report dated Aug. 4, 2015 for the PCT Application No. PCT/JP2014/069357.

* cited by examiner

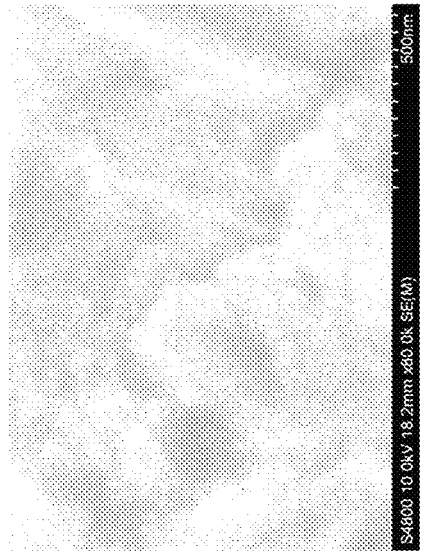
FIG.2A
FIG.2B
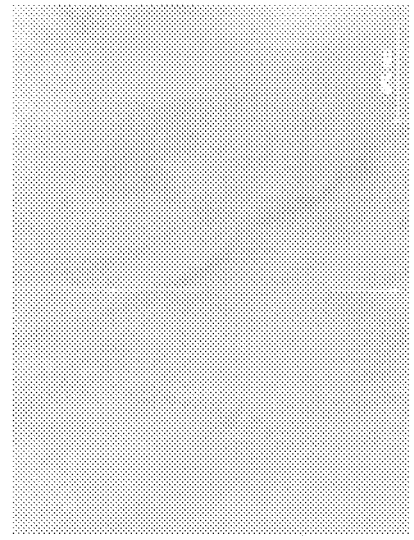
FIG.2C
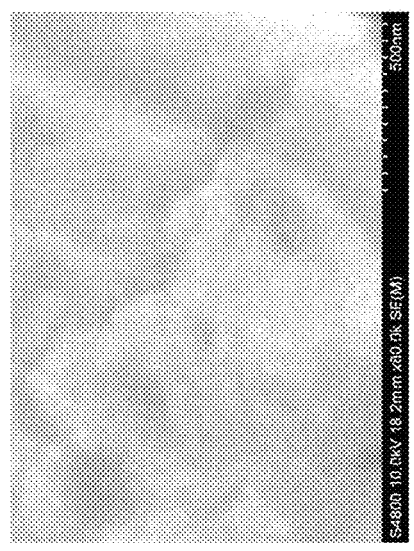
FIG.2D

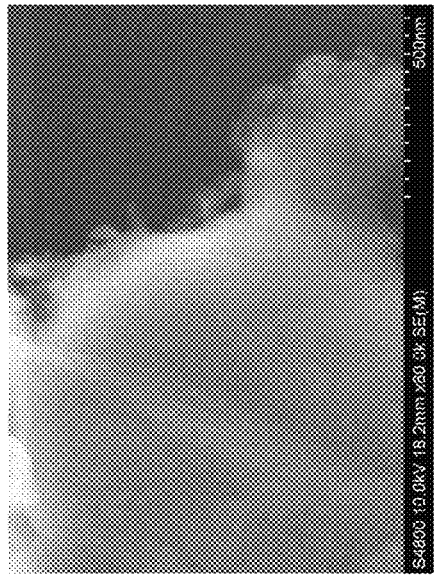

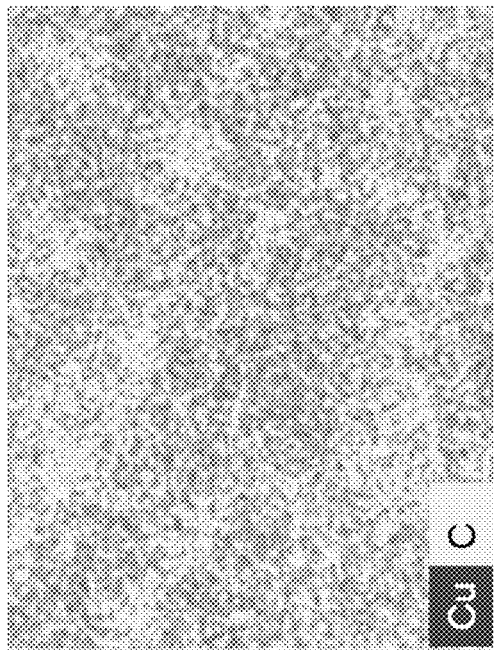
FIG.11B
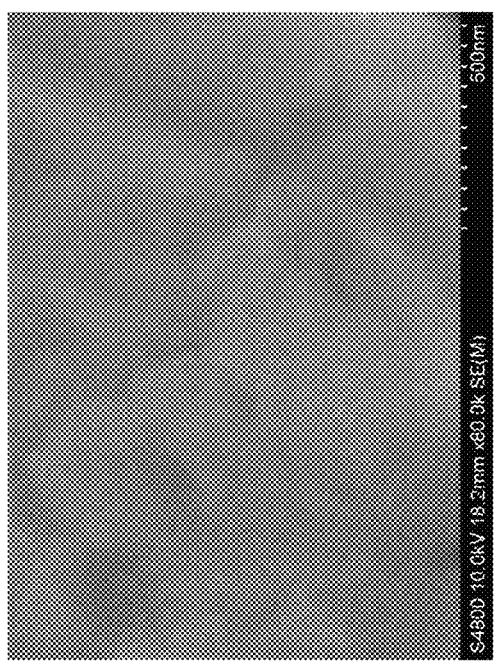
FIG.11A
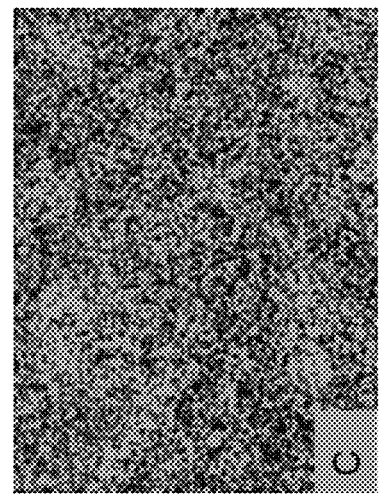
FIG.11C
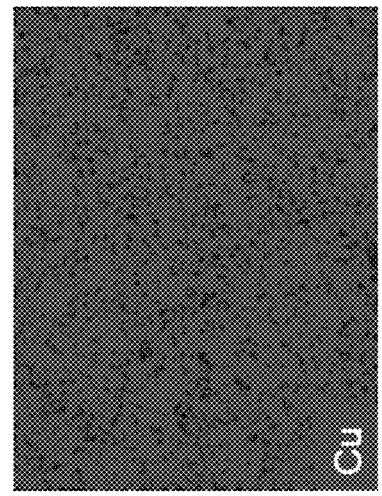

CNT METAL COMPOSITE MATERIAL, AND METHOD FOR PRODUCING SAME

CROSS REFERENCE TO RELATED APPLICATIONS

This application is based upon and claims the benefit of priority from PCT/JP2014/069357, filed on Jul. 22, 2014, and the prior Japanese Patent Application No. 2013-151956, filed on Jul. 22, 2013, the enter contents of which are incorporated herein by reference.

FIELD

The present invention is related to a metal composite material containing carbon nanotubes (hereinafter, referred to as CNT) and a method for producing the same.

BACKGROUND

Electronic devices have continuously aimed at miniaturization. Functionality and portability has improved due to miniaturization, applications have diversified, and they are used in various aspects of society. While miniaturization study of the device itself such as atomic transistor, atom memory devices has progressed, a large change in wiring for supplying power to the device has not been seen. With device miniaturization, current density increases due to miniaturization of circuits and the current density are approaching the limits of the existing conductive materials today. Related to the International Technology Roadmap for Semiconductors (ITRS), current density within devices is said to exceed the fracture limits of copper and gold in 2015. However, carbon based materials having a high current capacity have insufficient electric conductivity as wiring material and the development of new materials is a pressing problem.

To deal with such problems, techniques combining a carbon based material and metal are being developed. For example, a carbon nanotube (hereinafter, referred to as CNT) is known as a lightweight and high strength carbon fiber with excellent electrical conductivity and thermal conductivity, and techniques of applying metal plating to this are being examined. For example, electroplating method is a technique used in various applications, and in addition to conventional techniques using metal ions in a material, techniques are being reported for dispersing fibers or particles to a plating film with the purpose of imparting various functions.

For example, a method of forming a plating film in which CNTs are mixed into metal by adding a dispersion agent and CNTs to a plating solution and dispersing the CNTs in the plating solution is described in the Japanese Laid Open Patent Publication No. 2007-9333.

In addition, a composite material containing aluminum halides, CNTs, 1,3-dialkyl imidazolium halides having an alkyl group of 1 to 12 carbon atoms and/or mono-alkyl pyridinium halides as a nanocarbon/aluminum composite material having both high strength and electrical conductivity is described in the Japanese Laid Open Patent Publication No. 2007-70689.

SUMMARY

However, since a conventional composite material with a CNT and metal ion as described above uses a method for plating by dispersing the CNTs in a plating electrolyte, the dispersibility of CNTs in the plating electrolyte is low. In addition, since the CNTs are dispersed in the plating electrolyte using ultrasonic irradiation or stirring, the CNT is damaged during dispersion, and the excellent properties of the CNT are reduced. Furthermore, because it is difficult to disperse the CNTs in a plating electrolyte solution at a high concentration by this type of dispersion method, it is difficult to obtain a metallic composite material with a high CNT content.

On the other hand, in the case of plating on a high density CNT aggregate instead of dispersing the CNTs in the plating electrolyte as described above, it was difficult to plate metal uniformly to the inside of the CNT aggregate. Furthermore, when scale is increased, the difficulty of plating metal itself to the interior of a high density CNT aggregate becomes even higher.

In order to solve such problems, the present inventors reported a composite material obtained by depositing a metal on a CNT aggregate formed from a plurality of CNTs in PCT Publication No. WO2012/091139. FIG. 24 is a schematic diagram of such a CNT metal composite 900. The CNT metal composite material 900 is a composite material in which metal particles 920 are adhered to a CNT aggregate formed from a plurality of CNTs 11. That is, a structure is provided arranged with a CNT aggregate formed by depositing metal particles 920 into a plurality of CNTs 11. The CNT metal composite material 900 does not have a structure in which the metal particles 920 are deposited only on the outer surface of the CNT aggregate but has a structure in which the metal particles 920 are also deposited on the CNTs 11 in the interior of the CNT aggregate. FIG. 25 is a scanning electron microscope (SEM) image of the interior the CNT metal composite material 900. As is shown in FIG. 25, granular metal particles 920 with a size of 0.5 µm or more are observed on the inside of the CNT metal composite material 900.

The inventors reported that the CNT metal composite material 900 is a material having excellent electrical conductivity. However, the present inventors have further examined the development of a CNT metal composite material capable of applying a current larger than a metal while maintaining electrical conductivity to the same extent as metal. The preset invention aims to provide a CNT metal composite material which is lightweight, has high electrical conductivity and high electrical capacity and furthermore has high electric conductivity even at high temperatures and a producing method thereof.

According to one embodiment of the present invention, a CNT metal composite material depositing a metal into a plurality of CNTs is provided including 3% by weight or more and 70% by weight or less of the CNTs, a region is arranged with the metal uniformly distributed in a scanning electron microscope image magnified ten thousand times and the length of the region is at least 1 µm, a signal of the metal and a signal of carbon are not localized in a specific area in a two-dimensional elemental analysis image magnified ten thousand times, and a length of a region uniformly distributing the signal of the metal and the signal of carbon uniformly distributed is at least 1 µm, an allowable current density is at $6\times10^6$ A/cm$^2$ or more, and volume resistivity is $1\times10^{-6}$ Ω·cm or more and $5\times10^{-3}$ Ω·cm or less.

Related to one embodiment of the present invention, a CNT metal composite material depositing a metal into a plurality of CNTs is provided including 3% by weight or more and 70% by weight or less of the CNTs, a region is arranged with the metal uniformly distributed in a scanning electron microscope image magnified ten thousand times and the length of the region is at least 1 µm, a signal of the metal and a signal of carbon are not localized in a specific area in a two-dimensional elemental analysis image magnified ten thousand times, and a length of a region uniformly distributing the signal of the metal and the signal of carbon uniformly distributed is at least 1 µm, thermal conductivity in at least a part of a temperature range from 320K to 350K is higher than thermal conductivity at room temperature, and volume resistivity is $1 \times 10^{-6}$ Ω·cm or more and $5 \times 10^{-3}$ Ω·cm or less.

Related to one embodiment of the present invention, a CNT metal composite material depositing a metal into a plurality of CNTs is provided including 3% by weight or more and 70% by weight or less of the CNTs, a region is arranged with the metal uniformly distributed in a scanning electron microscope image magnified ten thousand times and the length of the region is at least 1 µm, a signal of the metal and a signal of carbon are not localized in a specific area in a two-dimensional elemental analysis image magnified ten thousand times, and a length of a region uniformly distributing the signal of the metal and the signal of carbon is at least 1 µm, resistance temperature coefficient in at least a part of a temperature range from 320K to 500K is $5 \times 10^{-3}$/K or less, and volume resistivity is $1 \times 10^{-6}$ Ω·cm or more and $5 \times 10^{-3}$ Ω·cm or less.

Related to one embodiment of the present invention, a CNT metal composite material depositing a metal into a plurality of CNTs is provided including 3% by weight or more and 70% by weight or less of the CNTs, a region is arranged with the metal uniformly distributed in a scanning electron microscope image magnified ten thousand times and the length of the region is at least 1 µm, a signal of the metal and a signal of carbon are not localized in a specific area in a two-dimensional elemental analysis image magnified ten thousand times, and a length of a region uniformly distributing the signal of the metal and the signal of carbon is at least 1 µm, a histogram distribution of signal intensity of a single metal mapped in a 1 µm square region has a single peak of maximum distribution value in a two-dimensional elemental analysis magnified ten thousand times, and volume resistivity is $1 \times 10^{-6}$ Ω·cm or more and $5 \times 10^{-3}$ Ω·cm or less.

Related to one embodiment of the present invention, a CNT metal composite material depositing a metal into a plurality of CNTs is provided including 3% by weight or more and 70% by weight or less of the CNTs, a region is arranged with the metal uniformly distributed in a scanning electron microscope image magnified ten thousand times and the length of the region is at least 1 µm, a signal of the metal and a signal of carbon are not localized in a specific area in a two-dimensional elemental analysis image magnified ten thousand times, and a length of a region uniformly distributing the signal of the metal and the signal of carbon is at least 1 µm, an intensity ratio between the largest intensity peak attributed to the metal and the largest intensity peak attributed to an oxide of the metal is 10 or more when an X-ray diffraction analysis is performed using a Cu-Kα ray as a radiation source, and volume resistivity is $2 \times 10^{-6}$ Ω·cm or more and $5 \times 10^{-3}$ Ω·cm or less.

In the CNT metal composite material, at least a part of the plurality of CNTs are oriented.

In the CNT metal composite material, the metal is a plating metal.

In the CNT metal composite material, the metal is selected from a group consisting of gold, copper, silver, nickel, zinc, chromium, platinum, tin, an alloy thereof or solder.

In the CNT metal composite material, the metal is copper.

In the CNT metal composite material, the metal is copper, and intensity sizes of (111), (200), (220) measured by X-ray diffraction analysis using a Cu-Kα ray as a radiation source is (111)>(200)>(220) when a diffraction angle 2θ is in a range of 40° or more and 80° or less.

Related to one embodiment of the present invention, a method of producing a CNT metal composite material is provided including a step of preparing a CNT aggregate with a distribution maximum of a pore diameter of 50 nm or less measured by a BJH method using an adsorption isotherm using liquid nitrogen, a first electroplating step of immersing the CNT aggregate in an electroplating solution including a metal salt and an organic solvent dissolving the metal salt, and performing electroplating, a reducing step by annealing the electroplated CNT aggregate under a hydrogen environment, a second electroplating step of immersing the electroplated CNT aggregate in an electroplating solution including a metal salt and water dissolving the metal salt, and performing electroplating, and a step of applying a current of $6 \times 10^6$ A/cm$^2$ or more to the CNT aggregate subjected to the second electroplating process for 10 minutes or more.

In the method of producing the CNT metal composite material, the organic solvent is acetonitrile.

In the method of producing the CNT metal composite material, the metal salt includes copper.

In the method of producing the CNT metal composite material, the reducing step is performed in a hydrogen atmosphere.

In the producing method of the CNT metal composite material, a treatment temperature of the reducing step is 100° C. or more and 700° C. or less.

BRIEF EXPLANATION OF THE DRAWINGS

FIG. 2A is a scanning electron microscope (SEM) image of a CNT metal composite material 100 related to one embodiment of the present invention;

FIG. 2B is a scanning electron microscope (SEM) image of a CNT metal composite material 100 related to one embodiment of the present invention;

FIG. 2C is a scanning electron microscope (SEM) image of a CNT metal composite material 100 related to one embodiment of the present invention;

FIG. 2D is a scanning electron microscope (SEM) image of a CNT metal composite material 100 related to one embodiment of the present invention;

FIG. 10A is an enlarged SEM image of the CNT metal composite material 100 related to one example of the present invention;

FIG. 10B is an enlarged SEM image of the CNT metal composite material 100 related to one example of the present invention;

FIG. 10C is an enlarged SEM image of the CNT metal composite material 100 related to one example of the present invention;

FIG. 11A is SEM image of the CNT metal composite material 100;

FIG. 11B is a measurement result of EDX related to one example of the present invention;

FIG. 11C is a measurement result of EDX related to one example of the present invention;

REFERENCE SYMBOLS

Figure 1:
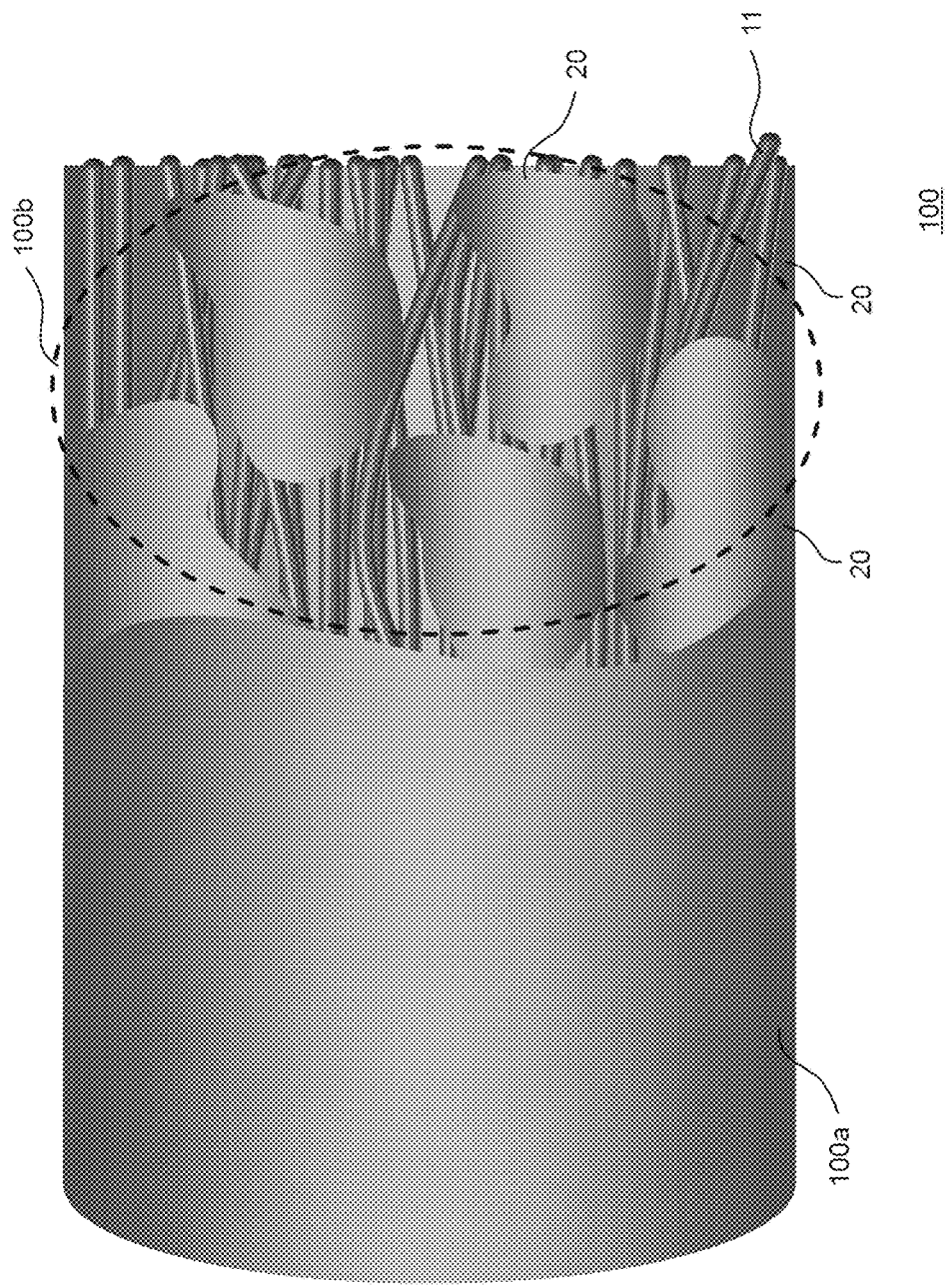
FIG. 1 is a schematic diagram of a CNT metal composite material 100 related to one embodiment of the present invention.

10: CNT aggregate, 11: CNT, 12: fibrous CNT, 13: CNT oriented aggregate, 15: assembled part, 15a: assembled part, 15b: assembled part, 17: dispersed part, 20: metal, 100: CNT metal composite material related to the present invention, 100a: exterior surface of the CNT metal composite material, 100b: internal cross-section of the CNT metal composite material, 110: plated CNT aggregate, 150: substrate, 900: CNT metal composite material, 900a: exterior surface of the CNT metal composite material, 900b: internal cross-section of the CNT metal composite material, 920: metal, 5000: synthesizing apparatus related to the present invention, 5010: substrate, 5011: substrate, 5020: catalyst layer, 5030: synthesis furnace, 5040: gas supply pipe, 5050: gas exhaust pipe, 5060: heating means, 5070: heating region, 5080: substrate holder, 5090: source gas cylinder, 5100: catalyst activation material cylinder, 5110: atmosphere gas cylinder, 5120: reduction gas cylinder, 5130: carbon weight flux adjustment means, 5140: retention time adjusting means, 5150: heating volume, 5200: gas injection means, 5210: gas flow formation means, 5220: turbulence suppression means, 6010: silicon substrate, 6050: metal ion solution, 6100: electroplating bath, 6110: anode, 6130: cathode, 6150: electroplating solution, 6170: insulation spacer Embodiments A CNT metal composite material and a producing method thereof related to the present invention are explained below while referring to the drawings. The CNT metal composite material and producing method thereof of the present invention is not intended to be interpreted as being limited to the description of the embodiments and examples shown below. In the drawings referenced in the present embodiments and examples described later, the same parts or parts having similar functions are attached with the same reference symbols, and a repeated description thereof will be omitted.

FIG. 1 is a schematic diagram of a CNT metal composite material 100 related to an embodiment of the present invention. In FIG. 1, an external part 100a of the CNT metal composite material 100, and an internal cross-section 100b cleaving and cutting the CNT metal composite material 100 are shown. In addition, FIG. 2A to 2D are scanning electron microscope (SEM) images of the CNT metal composite material 100. The CNT metal composite material 100 is a composite material in which a metal 20 is deposited to a CNT aggregate 10 formed from a plurality of CNTs 11 (shown in FIG. 3). That is, the CNT metal composite material 100 has a structure comprising a CNT aggregate 10 formed by depositing a metal 20 into a plurality of CNTs 11. The CNT metal composite material 100 does not have a structure in which the metal 20 is deposited only on the exterior surface of the CNT aggregate 10 but has a structure in which the metal 20 is also deposited on the CNT 11 in the interior of the CNT aggregate 10.

Figure 25:
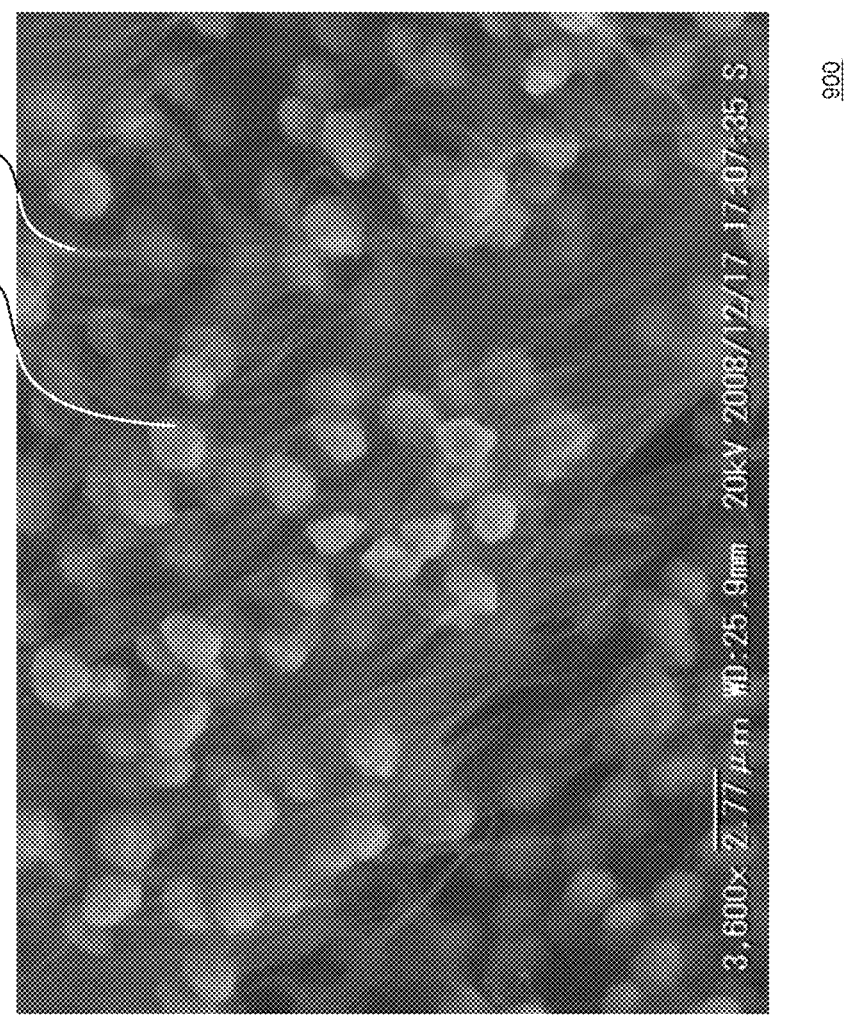
FIG. 25 is a SEM image of the interior of the CNT metal composite material 900 of a comparative example.

Here, as is clear when compared with FIG. 25, in a scanning electron microscope image magnified ten thousand times, the CNT metal composite material 100 of the present invention comprises a region in which CNTs are uniformly distributed. As a result, in the CNT metal composite material 100, it is difficult to clearly distinguish the CNT 11 and the metal 20 in the SEM image. The inventors first found that the CNT metal composite material 100 has high electrical conductivity and high electric capacity, and furthermore has high electrical conductivity even at high temperatures by having such a structure and the inventors completed the present invention.

In addition, the CNT metal composite material 100 related to the present embodiment is preferred to have a length of a region in which CNTs are uniformly distributed, that is, the length of a region in which the CNTs 11 are uniformly dispersed and the metal 20 is deposited is preferred to be at least 1 μm, more preferably 2 μm or more, and even more preferably 5 μm or more. By arranging such a large region in which CNTs 11 are uniformly distributed, the CNT metal composite material 100 related to the present embodiment can exhibit high electrical conductivity and high electric capacity.

In addition, the CNT metal composite material 100 related to this embodiment includes CNTs of 3 wt % t or more, preferably 5 wt % or more, and more preferably 10 wt % or more and 70 wt % or less. The greater the contained amount of CNTs in the CNT metal composite material 100, the more suitable CNT metal composite material can be manufactured with light weight and high strength with CNT characteristics of excellent electrical conductivity and thermal conductivity. If the CNT content is less than 3 wt %, the CNT metal composite material does not exhibit excellent conductivity of a CNT. In addition, even if the CNT content exceeds 70 wt %, only the amount of metal deposited on the surface of the CNT aggregate increases and the conductivity of the CNT metal composite material does not improve.

In addition, the CNT metal composite material 100 related to the present embodiment has a 20% or more of volume content ratio of copper and more preferably a 25% or more of volume content ratio and 70% or less of volume content ratio. The greater the contained amount of CNTs in the CNT metal composite material 100, the more suitable CNT metal composite material can be manufactured with light weight and high strength with CNT characteristics of excellent electrical conductivity and thermal conductivity. When the copper volume content ratio is less than 20%, the CNT metal composite material does not exhibit the excellent conductivity of copper. In addition, even when content ration of copper exceeds a volume content ratio of 70%, only the amount of metal deposited on the surface of the CNT aggregate increases and the conductivity of the CNT metal composite material does not improve.

Measuring an adsorption and desorption isotherm at 77K of liquid nitrogen, a BET specific surface area of the CNT metal composite material 100 calculated using a Brunauer, Emmett, Teller method from the adsorption and desorption isotherm is 0.1 m$^2$/g or more and 100 m$^2$/g or less, preferably 80 m$^2$/g or less, and more preferably 50 m$^2$/g or less. If the BET specific surface area is low, this shows that metal and CNTs are integrated and that a good interface is formed between the metal and the CNTs. Such a CNT metal composite material has excellent conductivity. The CNT metal composite material 100 related to the present embodiment shows excellent conductivity by having a BET specific surface area in the range described above.

In addition, in the CNT metal composite material 100 related to this embodiment, a signal of the metal 20 and signal of carbon (C) are not localized to a specific area. It is preferred that a region in which the signal of metal and the signal of C are uniformly distributed in a two-dimensional elemental analysis magnified ten thousand times using an energy dispersion X-ray analysis (EDX) exists with the length of at least 1 μm, more preferably 2 μm or more, and more preferably at 5 μm or more. A region in which the signal of the metal 20 and the signal of carbon (C) derived from CNTs 11 are uniform shows a region in which CNTs 11 are uniformly dispersed and the metal 20 is deposited, and by arranging such a large region, the CNT metal composite material 100 related to the present embodiment can exhibit high electrical conductivity and high electric capacity.

In addition, the CNT metal composite material 100 related to this embodiment has a single peak of maximum distribution value in a histogram distribution of signal strength of a metal mapping a 1 μm square region in a two-dimensional elemental analysis magnified ten thousand times using EDX. The metal mentioned here indicates a single element. For example, in the case of an alloy, a plurality of histograms exist corresponding to the respective elements which form the alloy. At that time, it is sufficient that a histogram distribution of a plurality of metal elements which form the alloy shows a single peak of maximum distribution value. For example, in an elemental analysis of the interior of the CNT metal composite material 900 reported previously by the present inventors, because the CNT metal composite material 900 has a structure in which the metal particles 920 are deposited into a plurality of CNTs 11, a peak due to the metal particles 920 is observed in a 1 μm square region, and the histogram distribution of signal strength of the metal has a plurality of maximum distribution peaks. On the other hand, since the CNT metal composite material 100 related to the present embodiment comprises a region in which CNTs 11 are uniformly distributed and the metal 20 is deposited, this indicates a single peak of maximum distribution value in a histogram distribution of signal strength of the metal and as a result, it is possible to exhibit high electrical conductivity and high electric capacity.

The CNT metal composite material 100 related to this embodiment having the structure described above has an allowable current density of $6\times10^6$ A/cm$^2$ or more and a volume resistivity of $1\times10^{-6}$ Ω·cm or more and $5\times10^{-3}$ Ω·cm or less. The allowable current density of the CNT metal composite material 100 of the present embodiment is preferably $1\times10^7$ A/cm² or more, more preferably $2\times10^7$ A/cm² or more. The CNT metal composite material 100 related to the present embodiment can realize an allowable current density which surpasses the allowable current density of metal 20. For example, Cu or Au which are general conductive materials having an allowable current density of $10^6$ A/cm² or less. The CNT metal composite material 100 related to the present embodiment can realize an allowable current density more than 100 times the allowable current density of the metal specific allowable current density. This is an allowable current density close to the theoretical limit of a CNT ($1000\times10^6$ A/cm²) and is an unexpected tremendous allowable current density which has not been reported in a conventional CNT metal composite material. Furthermore, the allowable current density of the CNT metal composite material 100 related to the present embodiment cannot exceed the theoretical limit of a CNT.

In addition, the CNT metal composite material 100 related to the present embodiment has a very low resistance and is preferably $5\times10^{-3}$ Ω·cm or less as an upper limit of the volume resistivity, and more preferably $1\times10^{-4}$ Ω·cm or less, and still more preferably $5\times10^{-5}$ Ω·cm or less. Although a lower volume resistivity is preferred, it is not possible to reduce the volume resistivity lower than $1\times10^{-6}$ Ω·cm as a lower limit. Therefore, the CNT metal composite material 100 related to the present embodiment is an excellent CNT metal composite material having a high conductivity.

In addition, the CNT metal composite material 100 related to the present embodiment has a thermal conductivity in a temperature range of at least one part of the temperature range from 320K to 350K higher than thermal conductivity at room temperature. Generally, the thermal conductivity of metal tends to decrease as temperature increases. On the other hand, the CNT metal composite material 100 related to the present embodiment has a thermal conductivity in a temperature range of at least one part of the temperature range from 350K to 320K higher than thermal conductivity at room temperature, and is a material showing the opposite behavior to a conventionally known material including a metal.

In addition, the CNT metal composite material 100 related to the present embodiment has a temperature coefficient of resistivity of $5\times10^{-3}$/K or less in at least one part of a temperature range from 320K to 500K, preferably $4\times10^{-3}$/K or less, more preferably $3\times10^{-3}$/K or less, more preferably $2\times10^{-3}$/K or less, and more preferably $1\times10^{-3}$/K or less. The temperature coefficient of resistivity of the CNT metal composite material 100 related to the present embodiment in at least one part of a temperature range from 320K to 500K also is lower than metal specific temperature coefficient of resistivity and therefore, the CNT metal composite material 100 is an excellent conductive material in which an increase in resistance that comes with an increase in temperature can be significantly suppressed.

In addition, in the CNT metal composite material 100, for example, in the case where copper (Cu) is deposited on the CNT aggregate 10 as the metal, when an X-ray diffraction analysis (X-ray diffraction XRD) of an internal cross-section 100b of the CNT metal composite material 100 using Cu-Kα ray ($\lambda=0.15418$ nm) as the radiation source is performed (θ-2θ method), an intensity ratio between the largest intensity peak attributed to the metal (copper) and the largest intensity peak attributed to metal oxides (in the case of copper, copper oxide (I) ($Cu_2O$) and copper oxide (II) (CuO)) is 10 or more, preferably 20 or more, and more preferably 50 or more. A peak due to a metal oxide cannot be observed and equivalent to the noise level, the intensity ratio is very large and the peak due to a metal oxide may include a state that cannot be substantially measured. Although there is no particular limit to an upper limit of the intensity ratio, when the intensity ratio is 100,000 or more, the peak due to the metal oxide is very small and is substantially difficult to evaluate. This intensity ratio shows the degree of oxidation of the metal, and means the greater the intensity ratio, the lower the percentage of metal that is oxidized. Since copper oxide has a significantly lower conductivity compared to copper, it is desirable that the CNT metal composite material 100 has a small amount of copper oxide as possible. Since the CNT metal composite material 100 related to the present embodiment has an intensity ratio of 10 or more, the oxidation degree of the copper used as the metal is very low and shows good electrical conductivity. Since the metal 20 covers the exterior periphery surface of the CNT aggregate 10 and a metal layer is sometimes formed as shown in FIG. 1, the interior of the CNT metal composite material 100 should be analyzed by an X-ray diffraction analysis, the CNT metal composite material 100 is cleaved and cut and the internal cross-section 100b is analyzed. At that time, after cutting and cleavage and until analysis, the CNT metal composite material 10 is preferred not to be exposed to oxygen as much as possible.

In the CNT metal composite material 100, in the case where copper (Cu) is deposited on the CNT aggregate 10 as the metal, the intensity sizes of (111), (200), (220) as measured by XRD using a Cu-Kα ray as the radiation source is preferred to be (111)>(200)>(220) when a diffraction angle 2θ is in a range of 40° or more and 80° or less. Since copper has such a diffraction pattern, if the size of the intensity of (111), (200), (220) of the CNT metal composite material as measured by XRD has such a diffraction pattern, this shows that the ratio of copper oxide included in the CNT metal composite material is low. Therefore, the CNT metal composite material 100 which shows the diffraction pattern as described above contains hardly any copper oxide and has excellent conductivity.

(CNT Aggregate)

Here, a CNT related to the present embodiment is explained. CNT 11 related to the present embodiment is preferred to be a single walled CNT (SWNT). If the CNTs are mainly unopened, the single walled CNT related to the present embodiment has a specific surface area of 800 m²/g or more, preferably 1000 m²/g. In addition, if the CNTs are mainly opened, a specific surface area is 1300 m²/g or more and preferably 1500 m²/g. The specific surface area of the CNT is preferably as large as possible, and it is explained as being about 1300 m²/g for unopened CNTs and 2600 m²/g for open CNTs according to a theoretical calculation. A CNT aggregate containing a single walled CNT having a high specific surface area as described above has a high interface density between CNT and metal in a CNT metal composite, and it is possible to manufacture an excellent CNT metal composite material 100 which combines the properties of metal and a CNT.

In addition, in the CNT 11 related to the present embodiment, carbon purity is preferred to be 98% by mass or more and/or metal impurities of 1% by mass or less. Impurities reduce the conductivity of the CNT metal composite material. A CNT with a carbon purity of 98% by mass or more and/or metal impurities of 1% by mass or less is suitable in the manufacture of a CNT metal composite material having a high conductivity. The purity of the CNT 11 related to the present embodiment is obtained from an elemental analysis using fluorescent X-rays. Although there is no upper limit to the carbon purity, due to producing circumstances, it is difficult to obtain a carbon purity of 99.9999% or more. Although there is no lower limit to the metal impurities, it is difficult to obtain metallic impurities of 0.0001% or less due to producing circumstances.

The CNT aggregate 10 related to the present embodiment preferably has a pore size distribution maximum of 50 nm or less, more preferably 40 nm or less, and more preferably 30 nm or less. A nano-sized pore between single walled CNTs can be obtained from an adsorption isotherm at 77K of liquid nitrogen. As a theoretical formula for calculating the pore size distribution, a BJH method (Refer to J. Amer. Chem. Soc. Magazine, Vol. 73 (1951), pp. 373) which assumes pores to be cylinder shaped can be used. Pore size as defined in the present specification is determined by the BJH method from the adsorption isotherm at 77K of liquid nitrogen. In the case where the distribution maximum of the pore size between CNTs is in the range described above, the CNT 11 can exist at a high density in the CNT metal composite material 100 and the CNT metal composite material 100 filled highly with the CNT 11 can be manufactured. In this way, the CNT metal composite material 100 which is filled highly with CNT 11 is an excellent CNT metal composite material 100 having high conductivity.

Figure 3:
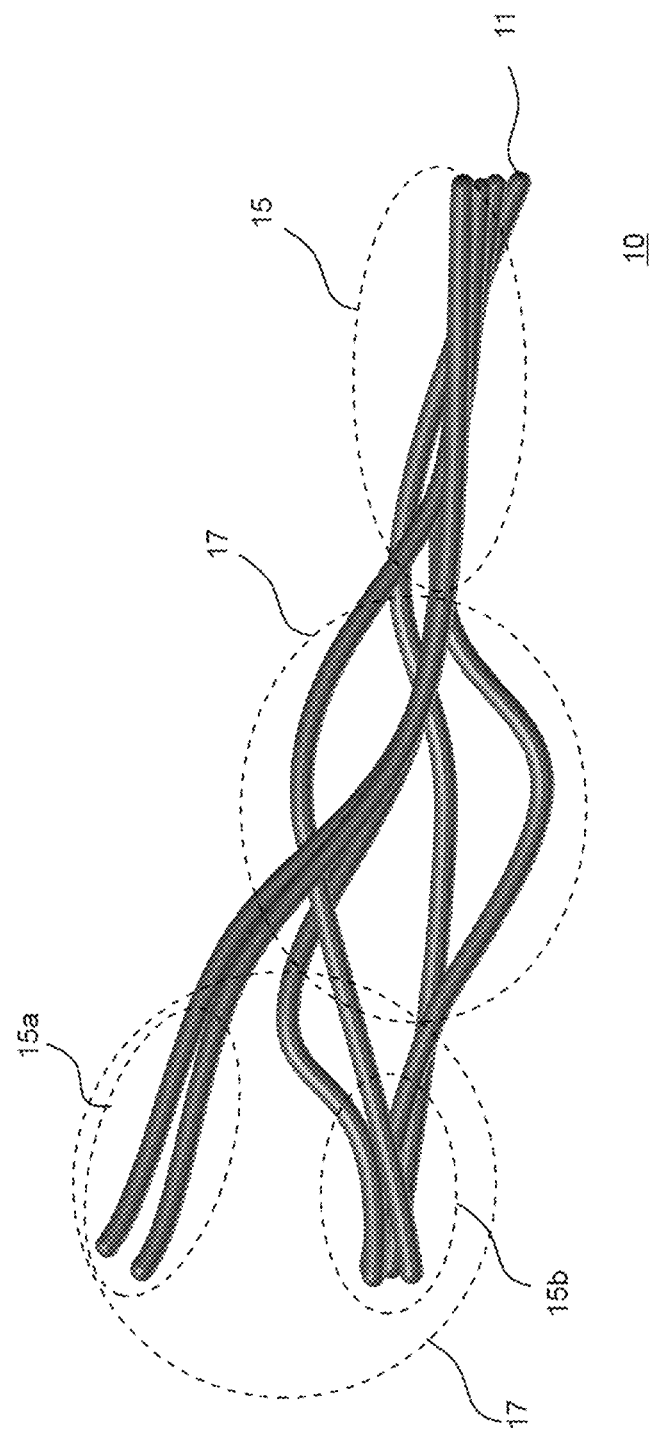
FIG. 3 is a schematic diagram showing a collected and distributed matrix structure of a CNT aggregate 10 related to one embodiment of the present invention.

In addition, the CNT aggregate 10 related to the present embodiment includes a matrix structure in which CNT 11 is collected and distributed. FIG. 3 is a schematic diagram showing a collected and distributed matrix structure of the CNT aggregate 10. Here, in the CNT aggregate "assembled" with a plurality of CNTs, "collection and distribution" CNTs means a part of the CNTs assemble and separate locally, that is, has a "dispersed" state. In FIG. 3, the CNT aggregate 10 having a plurality of assembled CNTs 11 is shown as having an assembled part 15 and a dispersed part 17. In addition, in FIG. 3, the assembled part 15a and the assembled part 15b are dispersed from one another.

Since the CNT aggregate 10 related to the present embodiment comprises a matrix structure in which CNTs 11 are collected and distributed, a path through which electricity flows is formed between the CNTs. As a result, the CNT aggregate 10 comprising a collected and distributed matrix structure is suitable for the manufacture of the CNT metal composite material 100 having excellent electrical conductivity. In addition, in the dispersed part 17 of the CNT aggregate 10, it is possible to form a space which can be deposited with the metal 20. In this way, as is shown in FIG. 1 and FIG. 2A to FIG. 2D, the CNT metal composite material 100 can include a structure in which the metal 20 is deposited not only on the exterior surface of the CNT aggregate 10 but also on the CNT 11 on the interior of the CNT aggregate 10 in which CNTs are present at a high density with a pore size distribution maximum of 50 nm or less, making it possible to produce the CNT metal composite material 100 that is highly filled with CNTs. Furthermore, since CNTs are close to each other in the assembled part 15, electricity can flow between CNTs, and it is possible to produce a CNT metal composite material having excellent conductivity such as the CNT metal composite material 100.

The CNT metal composite material 100 related to the preset embodiment is preferred to have good electrical conductivity by comprising a matrix structure in which CNTs 11 are collected and distributed. In the prior art, because a CNT metal composite material does not have a matrix structure in which CNTs 11 are collected and distributed, the metal 20 cannot be deposited to the interior of the CNT aggregate 10 under the condition that the CNTs 11 are present at a high density with a pore size distribution maximum of 50 nm or less, and a path through which electricity flows between CNTs is not formed. As a result, in the prior art, it was difficult to produce a CNT metal composite material having excellent conductivity such as the CNT metal composite material 100. The CNT metal composite material 100 is preferably arranged with CNTs in which a plurality of CNTs 11 are in the form of a fibrous bundle. When a fibrous CNT in which a plurality of CNTs 11 has a bundle form is included, it is easy for pairs of CNTs 11 to form a continuous structure which is preferable for producing a CNT metal composite material having excellent conductivity.

Here, a fibrous CNT has a length of 2 μm or more and more preferably 3 μm or more. Such a CNT metal composite material 100 having a long fibrous CNT can be easily formed with CNTs 11 having a continuous structure and has excellent conductivity.

Although the CNT metal composite material 100 is a material which the CNT 11 are in complex with the metal 20 in, the CNT metal composite material 100 does not comprise the CNT metal composite material 900 in which metal particles 920 are deposited into a plurality of CNTs 11 as described above. The CNT metal composite material 100 has a structure in which the CNTs 11 are uniformly dispersed and metal 20 is deposited, and it is difficult to distinguish the CNT 11 and the metal 20 in a SEM observation.

In addition, a CNT aggregate 10 includes a CNT which deposits the metal 20 on a surface of the CNTs forming a CNT matrix structure. Deposited is widely interpreted as meaning that at least a part of a CNT is in contact with the metal 20, at least a part of a CNT is covered with the metal 20, at least a part of a CNT is attached with the metal 20 so as to be overlaid and wrapped with the metal 20, at least a part of a CNT is attached with the metal 20 so as to stretch a film on the surface of the metal 20, and at least a part of a CNT is inserted in contact with a surface of the metal 20. In the present specification, deposited does not mean coating to completely cover a CNT matrix structure but at least a part of the metal 20 is deposited continuously on the CNT 11 on the exterior and interior of the CNT aggregate 10 as shown in FIG. 1. FIG. 2A to FIG. 2D are SEM images of the CNT metal composite material 100 produced in Example 1. FIG. 2A is a SEM image of the vicinity of a fractured surface of the CNT metal composite material 100 which is fractured in order to observe an internal cross-section 100b. FIG. 2B is a SEM image of the internal cross-section 100b, and FIG. 2C is a SEM image of the internal cross-section 100b. FIG. 2D is a SEM image of the internal cross-section 100b. As is clear from FIGS. 2A to 2D, the CNT metal composite material 100 related to the present embodiment includes a structure in which CNTs 11 are dispersed uniformly and the metal 20 is deposited, and it is difficult to distinguish the CNT 11 and the metal 20. Therefore, by depositing the metal 20 on the surface of the CNT 11 forming a CNT matrix structure in the CNT metal composite material 100 related to the present embodiment, a good interface between the CNT 11 and the metal 20 can be formed which is preferable for producing of a CNT metal composite material having excellent conductivity.

The CNT metal composite material 100 related to the present embodiment preferably includes a structure in which at least a part of a plurality of CNTs is oriented. Since the CNT aggregate 10 is a material of oriented CNT aggregates (hereinafter referred to as "CNT oriented aggregate"), the CNT aggregate 10 has high orientation. The CNT metal composite material 100 having a structure in which at least a part of the plurality of CNTs 11 is oriented has good conductivity in the direction of orientation of the CNTs 11.

On the other hand, since the composite material in the Japanese Laid Open Patent Publication No. 2007-9333 and the Japanese Laid Open Patent Publication No. 2007-70689 which is plated by dispersing CNTs in a plating electrolyte do not include a structure in which a part of a CNT is oriented as the CNT metal composite material 100, good electrical conductivity in the orientation direction of the CNT is not shown.

(Metal)

Here, a metal used in the plating of the CNT metal composite material 100 related to the present embodiment is explained. In the present specification, a plating metal means a metal which can be subjected to a plating treatment. The metal used in the plating of the CNT metal composite material 100 can be selected from a group consisting of gold, copper, silver, nickel, zinc, chromium, platinum, tin and alloys thereof, and a solder. Although the metals related to the present embodiment are not limited to these, since these metals have high conductivity, the metals can be suitably used for the plating of the CNT metal composite material 100. In particular, since copper has high conductivity and is inexpensive compared to noble metals it is suitable as an industrial material.

(Substrate)

The CNT metal composite material 100 related to the present embodiment can be formed by being placed on a substrate. As long as the CNT aggregate 10 can be placed, the substrate related to the present embodiment is not particularly limited. Generally, any substrate on which wiring and circuits etc. are formed may be used such as a semiconductor substrate using silicon, silicon carbide (SiC), sapphire, gallium phosphide (GaP), gallium arsenide (GaAs) wafer, indium phosphide (InP), gallium nitride (GaN) or the like, glass, a metal substrate such as stainless steel such as SUS304 and YEF42-6 alloy having conductivity, a plastic substrate such as polyarylate (PAR) or polyethersulfone (PES), polycarbonate (PC), polyimide, polyethylene naphthalate (PEN), and polyethylene terephthalate (PET). On the other hand, since the CNT metal composite material 100 has conductivity, the substrate related to the present embodiment is preferred to include a surface having insulation properties in a surface for mounting at least the CNT metal composite material 100. By mounting the CNT metal composite material 100 on the substrate having an insulating surface and patterning the CNT metal composite material 100, it is possible to form wiring and circuits.

In addition, the CNT metal composite material 100 is preferably mounted on the substrate by controlling the position and/or orientation of the CNT aggregate 10. As explained above, the CNT metal composite material 100 having at least a partially oriented structure has good electrical conductivity in the direction of orientation of the CNT 11. As a result, mounting the substrate by controlling the position and/or orientation of the CNT aggregate 10 are important for providing high conductivity to the wiring and circuits. On the other hand, since a conventional composite material which is plated by dispersing a CNT in a plating electrolyte does not have a structure in which a part of the CNT is oriented such as the CNT metal composite material 100, high conductivity cannot be provided to the wiring and circuits by controlling the position and/or orientation of the CNT.

As described hereto, the CNT metal composite material 100 related to the present embodiment has a high conductivity and since patterning is possible, the CNT metal composite material 100 can be used as a conductive material and wiring. In addition, by arranging wiring formed by the CNT metal composite material 100 at predetermined intervals, it is possible to manufacture circuits. Since the CNT metal composite material 100 has a high electrical conductivity, it is suitable for the manufacture of various circuits.

(Producing Method)

Figure 4:
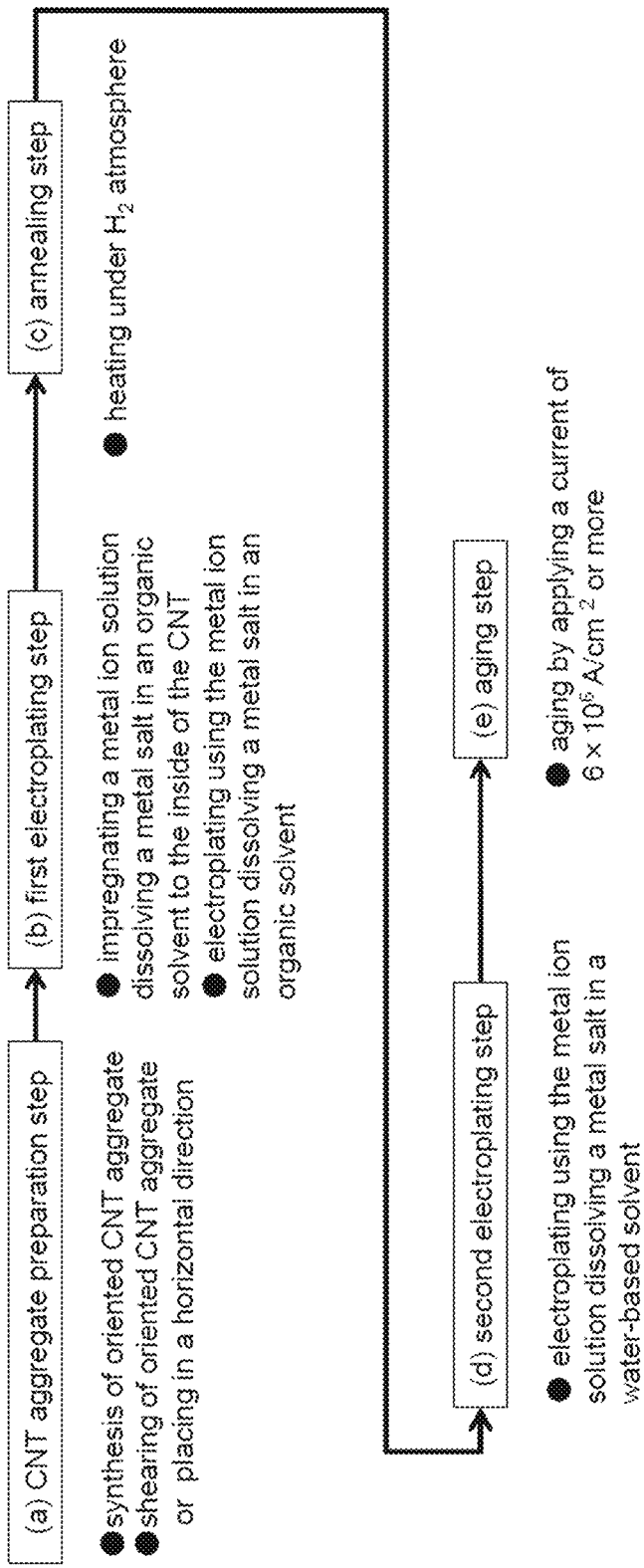
FIG. 4 is a flow diagram showing a producing process of the CNT metal composite material 100 related to one embodiment of the present invention.

A production method of the CNT metal composite material 100 related to the present embodiment is explained below. FIG. 4 is a flow diagram showing a producing process of the CNT metal composite material 100. The producing method of the CNT metal composite material 100 includes (a) a step of preparing a CNT aggregate 10 with a pore size distribution maximum measured by the BJH method from the adsorption isotherm using liquid nitrogen of 50 nm or less, (b) a first electroplating step of immersing the CNT aggregate 10 in an electroplating solution containing a metal salt and an organic solvent for dissolving the metal salt, and performing electroplating, (c) a reducing step by annealing the electroplated CNT aggregate 10 under a hydrogen environment, (d) a second electroplating step of immersing the electroplated CNT aggregate 10 in an electroplating solution containing a metal salt and water for dissolving the metal salt, and performing electroplating, and (e) a step (aging step) of applying a current of $6 \times 10^6$ A/cm$^2$ or more to the electroplated CNT aggregate 10 for 10 minutes or more.

(a) The step of preparing the CNT aggregate 10 is a step of producing an oriented CNT aggregate 13 comprised from CNT 11 and shearing. (b) The first electroplating step in which the CNT aggregate 10 is immersed in the electroplating solution and electroplating is performed is a step of immersing the prepared CNT aggregate 10 in a solution prepared by dissolving a metal salt in an organic solvent, the solution is immersed up to the interior of the CNT aggregate 10, electroplating is performed and metal is deposited to the interior of the CNT aggregate 10. (c) The annealing step of the electroplated CNT metal composite material 110 is a step of annealing the electroplated CNT metal composite material 110 in a reduction gas atmosphere and reducing the oxidized metal deposited on the CNT aggregate 10. (d) The second electroplating step is a step of immersing the electroplated CNT aggregate 10 in an electroplating solution prepared by dissolving a metal salt in an aqueous solvent and performing electroplating. (e) The aging step is a step of applying a current of $6 \times 10^6$ A/cm$^2$ or more through the electroplated CNT aggregate 10 for 10 minutes or more.

Figure 5:
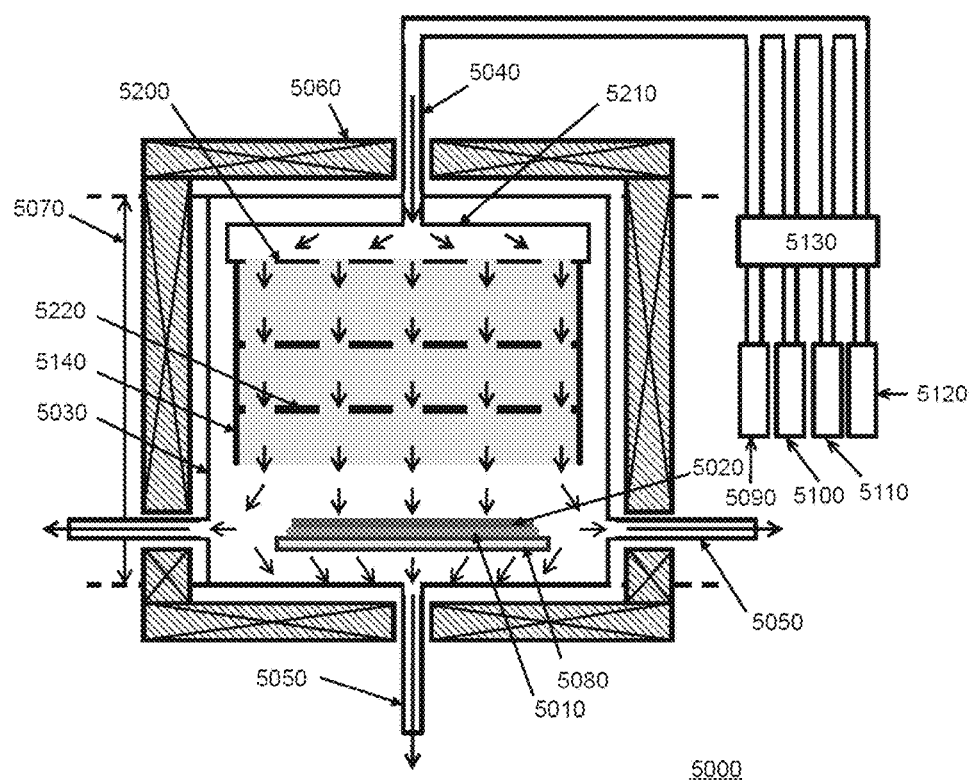
FIG. 5 is a schematic diagram showing an example of a synthesizing apparatus of an oriented CNT aggregate 10 related to one embodiment of the present invention.

Although the step of preparing the CNT aggregate 10 is not limited as long as the a CNT aggregate meets the conditions as defined herein can be obtained, the producing method in Japanese Patent Application No. 2010-544871 and Japanese Patent Application No. 2009-144716 are exemplified. An example of a synthesizing apparatus for the CNT oriented aggregate 13 used in the CNT metal composite material 100 is shown in FIG. 5. The synthesizing apparatus 5000 includes a synthesis furnace 5030 formed from, for example, silica glass or the like which receives a substrate 5010 having a catalyst layer 5020, a gas supply pipe 5040 arranged on an upper wall of the synthesis furnace 5030 and connecting with the synthesis furnace 5030, a gas exhaust pipe 5050 arranged on a lower wall or the side wall of a downstream side and connecting with the synthesis furnace 5030, a heating means 5060 formed from, for example, a resistance heating coil arranged on an exterior circumference of the synthetic furnace 5030, a heating temperature adjusting means for adjusting the furnace temperature to a certain temperature, and a heating region 5070 within the synthesis furnace 5030 which is heated to a predetermined temperature by the heating means 5060 and heating temperature adjusting means. In addition, as the heating volume becomes larger than the exhaust volume, a substrate holder 5080 for holding a substrate 5010 having the catalyst layer 5020 is arranged in the heating region 5070 of the synthetic furnace 5030.

A gas flow formation means 5210 for distributing and dispersing a source gas supplied from the gas supply pipe 5040 and for forming a source gas flow in a plurality of directions is arranged within the heating region 5070 above the substrate holder 5080 and/or the catalyst layer 5020. The gas flow formation means 5210 forms a flow of a source gas in a plurality of directions substantially parallel to the surface of the substrate 5010. In addition, a plurality of gas ejection means 5200 for forming a gas flow in a substantially perpendicular direction to the plane of the substrate 5010 is arranged in the gas flow formation means 5210.

By using this type of gas flow formation means 5210, after a source gas supplied from the gas supply pipe 5040 is expand and dispersed in a plane substantially parallel to the plane of the substrate 5010, it is possible to contact the gas with a catalyst from a substantially perpendicular direction to the plane of the substrate 5010.

In order to increase and/or adjust the retention time, a retention time adjusting means 5140 is arranged with the heating volume which is intentionally increased and or adjusted and a turbulence suppression means 5220 formed from a plurality of plate shaped current plates with a plurality of holes, the retention time adjusting means 5140 is connected with and in communication with the gas flow formation means 5210 between the gas injection means 5200 and the catalyst layer 5020.

The source gas increases the heating volume to be heated within the heating region 5070, and since it is possible to suppress the deposition of carbon impurities into the CNT when the retention time is adjusted to be longer, it is suitable for obtaining the CNT metal composite material 100.

Since the turbulence suppression means 5220 is suitable for suppressing a turbulent flow of the source gas in the retention time adjustment means 5140, and for suppressing the generation of carbon impurities, it is preferable in obtaining the CNT metal composite material 100.

The synthesizing apparatus comprises a source gas cylinder 5090 housing a carbon compound as a CNT source material, a catalyst activation material cylinder 5100 housing a catalyst activation material, an atmosphere gas cylinder 5110 housing carrier gas of the source gas or the catalyst activation material, and a reduction gas cylinder 5120 for supplying reducing the catalyst, and a carbon weight flux adjustment means 5130 in which the amount of each gas supplied from these cylinders can be controlled by a gas flow system.

Production of the CNT oriented aggregate 13 (FIG. 7) by this producing method involves producing a catalyst layer on a substrate 5010, and performing chemical vapor deposition (synthesis) of a plurality of CNTs from the catalyst.

Figure 6:
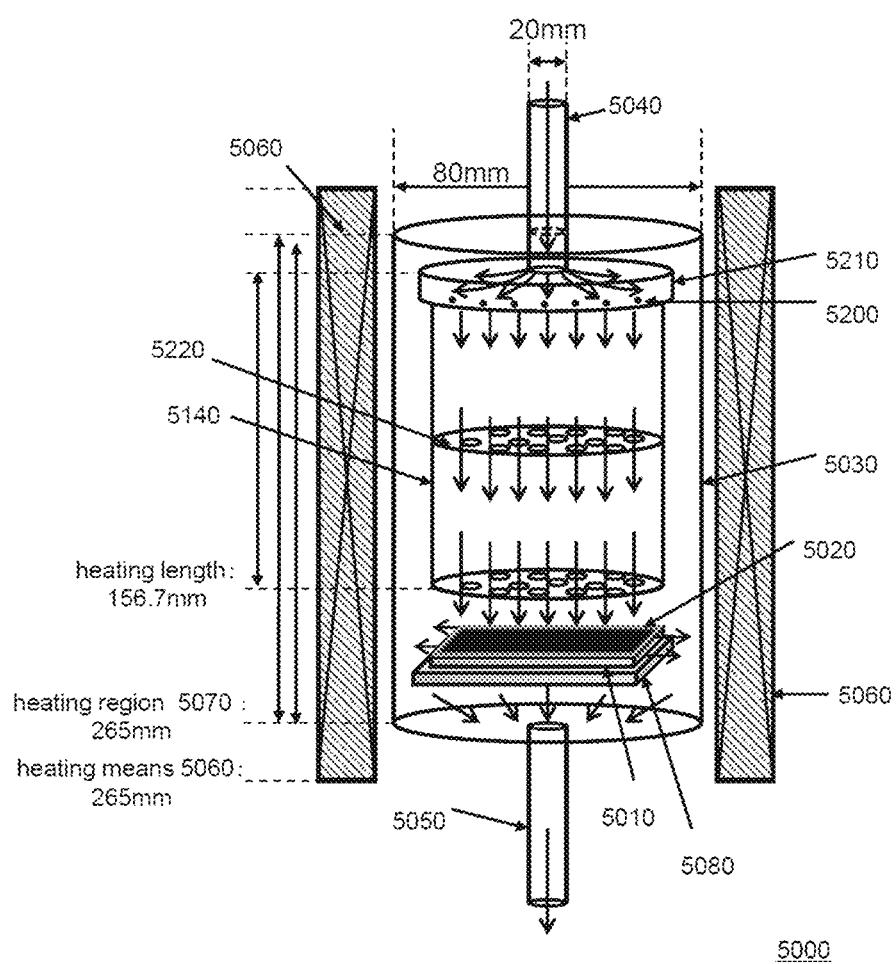
FIG. 6 is a schematic diagram showing an example of a synthesizing apparatus of an oriented CNT aggregate 10 related to one embodiment of the present invention.

Referring to FIG. 5 and FIG. 6, first, the substrate 5010 (for example, a silicon wafer) formed in advance in a separate process with the catalyst layer 5020 (for example, alumina-iron thin film) is loaded into in the synthesis furnace 5030 filled with an atmosphere gas (helium for example) supplied from the gas supply pipe 5040, and placed on the substrate holder 5080. At this time, the substrate 5010 is arranged so that a flow path of the source gas intersects generally vertically with a surface of the catalyst layer 5020 so that the source gas is efficiently supplied to the catalyst.

Next, the interior of the synthetic furnace 5030 is heated to a predetermined temperature (for example 750° C.) while supplying a reduction gas (hydrogen for example) from the gas supply pipe 5040 to the interior of the synthesis furnace 5030, and a formation process is performed which holds this state for a desired period of time.

Next, the supply of reduction gas and the atmosphere gas from the gas supply pipe 5040 is stopped or reduced according to desire (reaction conditions) using the carbon weight flux adjustment means 5130, and a source gas (ethylene for example), atmosphere gas and catalyst activating material (water for example) are supplied from the gas supply pipe 5040. After a gas flow is formed in a plurality of directions in an approximately parallel direction to the plane of the substrate 5010, these gases supplied from the gas supply pipe 5040 are sprayed onto the surface of the catalyst layer 5020 on the substrate 5010 with an approximately uniform amount in an approximately perpendicular direction to the plane of the substrate 5010 from a jet hole.

In addition, these gases flow the heating volume 5150 that was increased and adjusted by the retention time adjustment means 5140, and after an optimized retention time has passed, these gases contact with a surface of the catalyst layer 5020 at an optimized amount using the carbon weight flux adjustment means 5130, and a CNT is efficiently grown at high speed and high yield from the catalyst particles deposited on the substrate 5010 (growing step). Furthermore, by using the turbulence suppression means 5220, these gases are contacted with catalyst particles on the substrate 5010 in a substantially equal retention time. In addition, after contacting with the catalyst layer 5020, these gases are rapidly exhausted from the gas exhaust tube 5050 and the generation of carbon impurities is minimized.

After production of a CNT is completed, in order to suppress a source gas, the catalyst activating substance, their degradation products remaining in the synthesis furnace 5030 or carbon impurities present in the synthesis furnace 5030 being adhered to the CNT oriented aggregate 13, only an atmosphere gas is flown and contact of impurities with the CNT oriented aggregate 13 is suppressed (carbon impurity adhesion suppressing process).

Figure 7:
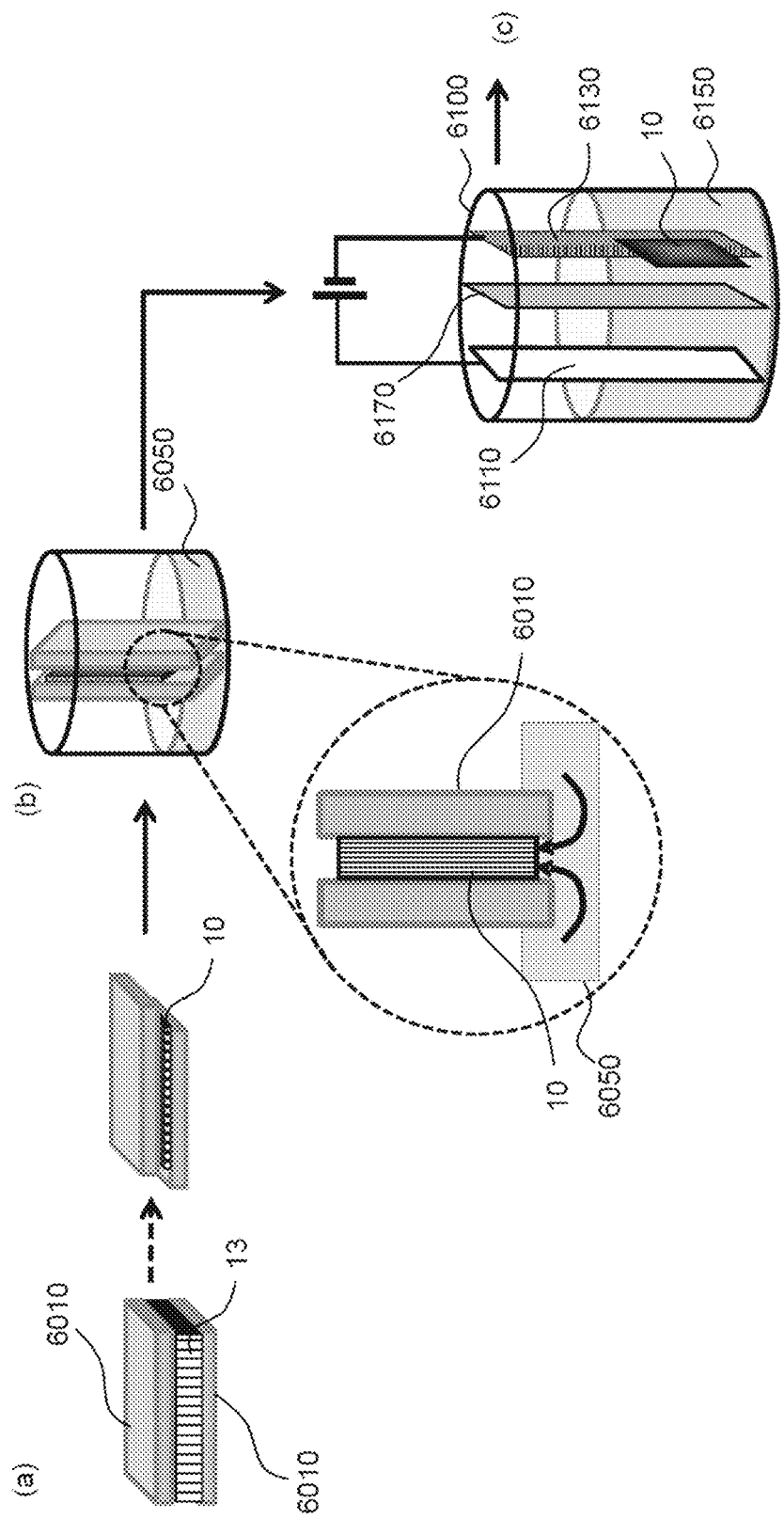
FIG. 7 is a schematic diagram showing a producing method of the CNT metal composite material 100 related to one embodiment of the present invention.

FIG. 7 is a schematic view showing a method of producing the CNT metal composite material 100. In this way, a plurality of CNTs grown at the same time from the catalyst layer 5020 on the substrate 5010, and grown in a direction perpendicular to the catalyst layer 5020, forms the oriented, highly pure CNT aggregate 10 with a high specific surface area and approximately uniform height. Therefore, the CNT aggregate 10 obtained by highly densifying the CNT oriented aggregate 13 can suitably produce the CNT metal composite material 100 having high conductivity.

The CNT oriented aggregate 13 obtained in this way is peeled off from the catalyst particles formed on the substrate 5010. Next, the peeled CNT oriented aggregate 13 is highly densified by shearing between two silicon substrates 6010 so as to deform the CNT aggregate 13 in which the CNT aggregate 10 oriented in a perpendicular direction is oriented in a horizontal direction. The CNT aggregate 10 manufactured in this way becomes an CNT aggregate with a pore size distribution maximum of 50 nm or less calculated by the BJH method from the adsorption isotherm of the liquid nitrogen. The CNT aggregate 10 which was prepared in this way is used in an electroplating process. In addition, in the producing method of the CNT metal composite material 100 related to the present embodiment, instead of the shearing step, the CNT oriented aggregate 13 oriented in a perpendicular direction is peeled from the substrate 5010 and may be attached so as to be oriented in a horizontal direction above a silicon substrate 6010.

In the first electroplating process, first, the tip is immersed in the solution 6050 in which metal salt is dissolved with an organic solvent as the solvent in a state in which the CNT aggregate 10 is sandwiched between the two silicon substrates 6010. Metal ions penetrate to the inside of the CNT aggregate 10 to due to surface tension and capillary action. In the CNT metal composite material 100 related to the present embodiment, an organic solvent rather than an aqueous solvent is preferably used for the metal ion solution 6050 which penetrates the CNT aggregate 10. Although an aqueous solvent is generally to densify the CNT aggregate, however, because it is necessary to permeate the metal ions to the inside of a highly hydrophobic CNT aggregate 10 in the present invention, an organic solvent is used. In the present embodiment, in particular acetonitrile is preferred. Since acetonitrile can be used as a non-aqueous solvent of an inorganic salt, it is suitable for permeating metal ions to the inside of the CNT aggregate 10. In addition, as described above, salt containing copper is preferred as the metal salt of this embodiment.

Next, the CNT aggregate 10 is sets to the cathode 6130, immersed in the electroplating solution 6150 and is subjected to electroplating. As described above, in the electroplating solution 6150 related to the present invention, because it is necessary to deposit metal to the interior of the highly hydrophobic CNT aggregate 10, a metal ion solution in which metal salt is dissolved with an organic solvent as the solvent is used. In the present embodiment, it is possible to suitably use acetonitrile as an organic solvent and salt including copper as a metal salt. Therefore, in the present embodiment, a high purity copper sheet is used as the anode 6110. In addition, although an insulation spacer 6170 is arranged in the electroplating bath 6100 in order to electrically separate the anode 6110 and cathode 6130, the insulation spacer 6170 is generally formed from a glass fiber. In the present embodiment, it is preferable to use a filter paper as the insulation spacer 6170. When electroplating is performed using a glass fiber insulation spacer, glass fiber is not preferable since it adheres to the CNT metal composite material 100.

In addition, in the first electroplating step, it is preferable that the average current density for electroplating of the CNT aggregate 10 is 10 mA/cm$^2$ or less. If the average current density is high, the exterior side of the CNT aggregate is plated first and the interior side of the CNT aggregate is not sufficiently plated. As the CNT metal composite material 100 related to the present embodiment, plating with a low average current density is preferred in order to form a structure in which the metal 20 is also deposited on the interior of the CNT 11 of the CNT aggregate 10.

The electroplated CNT metal composite 110 is annealed. The step of annealing the electroplated CNT metal composite material 110 is performed in a hydrogen atmosphere. In the electroplated CNT metal composite material 110, a deposited metal is oxidized and conductivity is not sufficiently high in this state. By annealing the electroplated CNT metal composite material 110 in a reduction gas atmosphere such as hydrogen, it is possible to reduce the oxidized metal deposited on the CNT metal composite material 110. The temperature of the annealing step is preferred to be 100° C. or more and 700° C. or less, and more preferably 150° C. or more and 500° C. or less in the case where copper is plated to CNT metal composite 110. If the electroplated CNT metal composite material 110 is annealed at a temperature in this range, it is possible to fuse metals together without precipitating the metal, and it is possible to improve the integrity of the CNT metal composite material 100.

The producing method of the CNT metal composite material 100 related to the present embodiment includes a second electroplating step in which the material is further immersed in an electroplating solution obtained by dissolving a metal salt in an aqueous solvent is performed after the step of annealing. By further electroplating the CNT metal composite 110 after the step of annealing, it is possible to further fill gaps in the metal deposited on the CNT metal composite material 110 by plating and conductivity is improved. Furthermore, water is preferred as the aqueous solvent used for the second electroplating step. The electroplating solution prepared by dissolving a metal salt in an aqueous solvent is preferred for plating metal on a metal.

The CNT metal composite material 110 subjected to the second electroplating step is subjected to an aging step of applying a current of 6×10$^6$ A/cm$^2$ or more for 10 minutes or more. In the present invention, the inventors unexpectedly found that by passing a current of high current density exceeding the allowable current density of the metal 20 in the CNT metal composite material 110, in a scanning electron microscope image magnified ten thousand times, a region is arranged in which CNTs are uniformly dispersed and deposited, high electrical conductivity and high electrical capacity is provided, and further it is possible to produce the CNT metal composite material 100 having high electric conductivity even at high temperatures.

By performing this aging process, metal particles with a small allowable current density are reconstructed into large metal crystals having a large allowable current density, and are inferred as being deposited in a state in which CNTs 11 are uniformly distributed. In this way, the CNT metal composite material 100 related to the present embodiment has high electrical conductivity and high electrical capacity, and it is further assumed that it is possible to provide higher electrical conductivity even at high temperatures. Aging of the CNT metal composite material by applying a large current exceeding the allowable current density of a metal is a treatment method that has not been reported so far.

Furthermore, the CNT metal composite material 100 may be annealed again after the second electroplating step. Since it is possible to perform a second annealing step in the same way as the first annealing step described above, a detailed description will be omitted.

EXAMPLES

The CNT metal composite material related to the present invention explained in the embodiments above is explained in detail below using specific examples. Furthermore, the following examples are merely an example and the CNT metal composite material and the producing method thereof of the present invention is not limited thereto.

In the present embodiment, a producing example of the CNT metal composite material 100 described above will be explained. First, in the step of preparing a CNT aggregate, the CNT oriented aggregate 13 is synthesized on a silicon substrate using the producing method in Japanese Patent Application No. 2010-544871 and Japanese Patent Application No. 2009-144716, and the CNT oriented aggregate 13 was peeled from the silicon substrate so that catalyst particles or carbon impurities are not mixed. The peeled CNT oriented aggregate 13 is sandwiched by two new silicon substrates having a thickness of 0.5 mm, the upper side silicon substrate was sheared and fixed with clips while the lower side silicon substrate is in a stationary state. In this way, a CNT aggregate 10 oriented in the shearing direction and semi-densified was obtained. A pore size diameter distribution maximum determined by the BJH method of the CNT aggregate 10 was 8 nm.

Next, 200 ml of a 2.75 mM of copper acetate acetonitrile solution was prepare as a copper ion solution with acetonitrile as a solvent, the ends of the CNT aggregate 10 sandwiched between the two silicon substrates was immersed, the copper ion solution was allowed to penetrate to the interior of the CNT aggregate, and high densified. The infiltration step of the copper ion solution was performed in a desiccator for 20 minutes.

Next, electrolytic plating was performed on the CNT aggregate 10 permeated with the copper ion solution. The electroplating step was performed using an electrolytic plating bath 6100 (VP3 galvanostat/potentiostat/frequency response analyzer, manufactured by Princeton Applied Research) arranged with an electrode in a polyether ether ketone (PEEK) resin container. The high density CNT aggregate 10 supported by a mesh of stainless steel was arranged in the cathode 6130 using a high purity copper sheet (11 mm×50 mm) as the anode 6110. A filter paper (manufactured by Advantech Inc. 14 mm×60 mm×0.2 mm) was placed as an insulation spacer between the anode 6110 and the cathode 6130. The copper ion solution described above was inserted into the solution 6050 and allowed to stand for 10 minutes in a vacuum desiccator so that the copper ion solution uniformly permeated the CNT aggregate 10.

Electroplating was performed for 72 hours using a constant current of 1 mA, and plated CNT metal composite material 110 was obtained. After the electroplating step, the plated CNT metal composite material 110 was removed from the stainless steel mesh and washed with pure acetonitrile to remove unreacted copper ions. Following this, the plated CNT metal composite material 110 was allowed to dry for 1 hour in a vacuum desiccator at 70° C.

Figure 8:
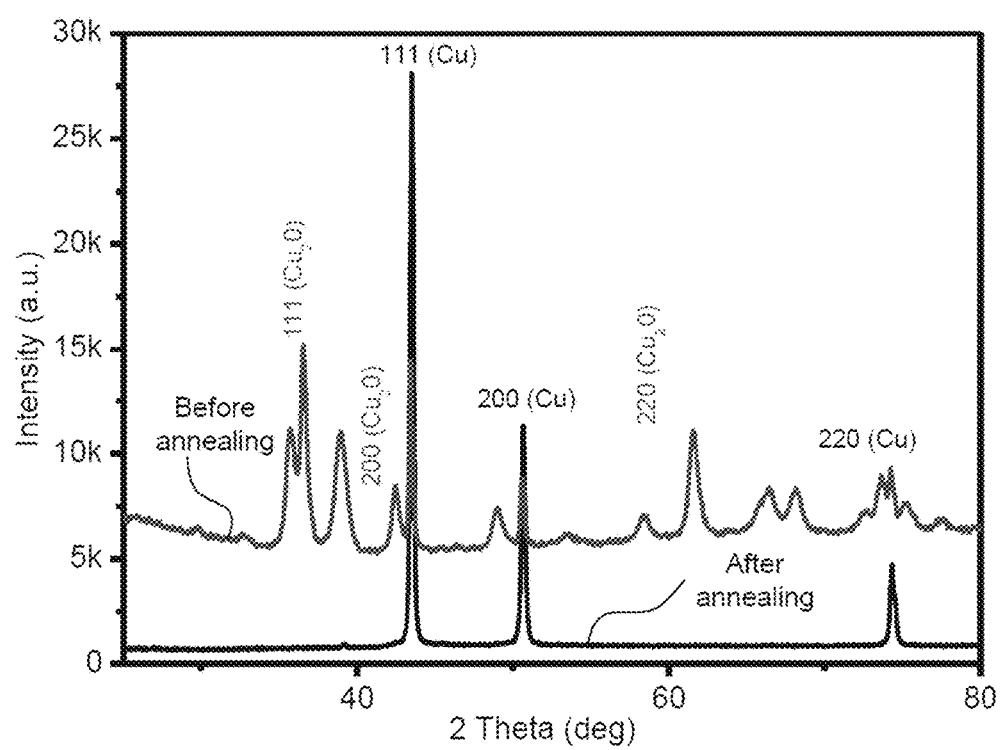
FIG. 8 is a diagram showing measurement results by XRD regarding the CNT metal composite material 110 that is plated before annealing, and the CNT metal composite material 110 after annealing related to one example of the present invention.

After drying, the plated CNT metal composite material 110 was annealed for three hours in a heating furnace at 250° C. under a constant flow of hydrogen ($H_2$) atmosphere of 150 sscm. In addition, similarly, when annealed for 30 min at 200° C. and 500° C., volume resistivity of the CNT metal composite 110 was $1.8 \times 10^{-5}$ Ω·cm. The volume resistivity of the CNT metal composite 110 decreased by the annealing step. XRD measurement results of the plated CNT metal composite material 110 before annealing and the CNT metal composite 110 after annealing are shown in FIG. 8. In the present example, the XRD measurement used an X-ray diffracting device (manufactured by Rigaku) with a 1.2 kW of Cu-Kα X-ray source was performed by the θ-2θ method. An X-ray diffraction analysis was performed at an interior cross-section obtained by cutting the CNT metal composite 110. In the plated CNT metal composite 110 before annealing, a peak derived from copper oxide (I) ($Cu_2O$) was detected and a peak intensity ratio between a peak derived from the copper oxide and the most intense peak of the copper (111) was 0.3. In CNT metal composite material 110 after annealing, a peak derived from copper oxide (I) ($Cu_2O$) was measured at a diffraction angle of 39.1° ((200) $Cu_2O$)), and intensity ratio to the most intense peak of copper (111) was 100. In addition, in the CNT metal composite material 110, a typical peak in high purity copper which becomes (111)>(200)>(220) was detected in a range of 40° or more and 80° or less with a diffraction angle 2θ. Therefore, it was clear that copper oxide was reduced to copper in a CNT metal composite material by annealing under reduction conditions, the CNT metal composite material 110 was not damaged, and the volume resistivity of the CNT metal composite material 100 was improved. Furthermore, since the output of the X-ray diffraction device used in the present example is low, carbon derived from the CNT was not detected.

A second electroplating step was performed on the CNT metal composite material 110 after annealing and electroplating was performed for 3 hours at 50 μA/$cm^2$ using a copper ion aqueous solution. The CNT metal composite material 110 subjected to the second electroplating step was annealed under the same conditions as the above conditions. As a result, the volume resistivity of the CNT metal composite 110 was reduced to $9.8 \times 10^{-5}$ Ω·cm and showed excellent conductivity. In the CNT metal composite material 110, a peak derived from the oxidation of copper (I) ($Cu_2O$) was measured at a diffraction angle of 39.1° ((200) $Cu_2O$)), and the intensity ratio to a most intense (111) peak of copper was 90.

In the present example, an aging step was performed on the CNT metal composite material 110 obtained in this way. The aging step was performed by applying a current of $6 \times 10^6$ A/$cm^2$ or more for 10 minutes or more through the electroplated CNT aggregate 10. Since the aging step is a step of reconstructing the metal 20 deposited on the surface of the CNT 11, it is also conceivable to carry out heating. However, in a simple heating process, the metal 20 deposited on the surface of the CNT 11 becomes separated from the CNT 11 after melting and a good interface between the CNT 11 and the metal 20 cannot be maintained.

Figure 9B:
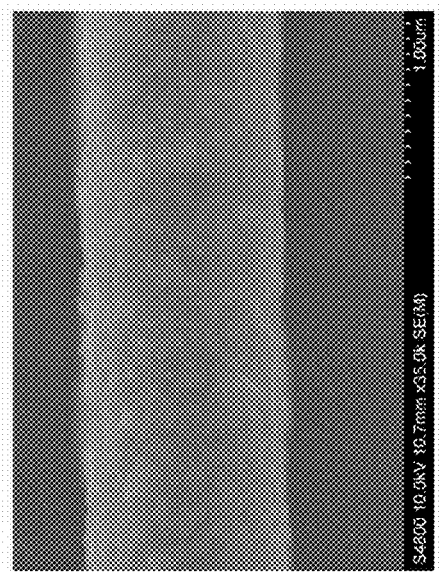
FIG. 9B is a SEM image of the CNT metal composite material 100 related to one example of the present invention.
Figure 9A:
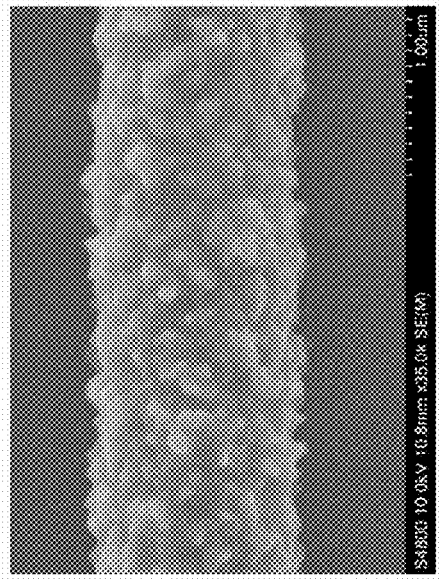
FIG. 9A is a SEM image of the CNT metal composite material 100 related to one example of the present invention.
Figure 9C:
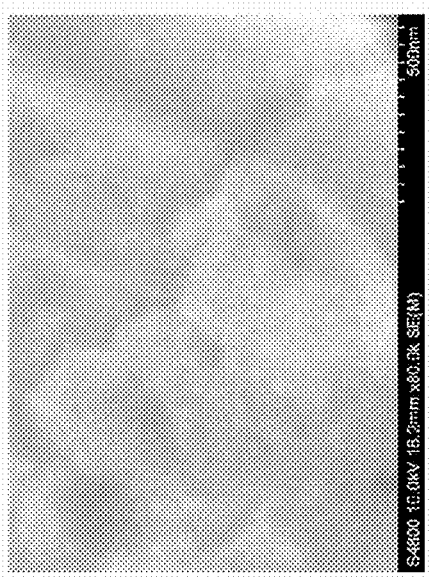
FIG. 9C is a SEM image of the CNT metal composite material 100 related to one example of the present invention.

A SEM image of the CNT metal composite material 100 related to the present example obtained in this way is shown in FIG. 9A to FIG. 9C. In FIG. 9A, is a SEM image of the exterior surface of the CNT metal composite material 110 before an aging step, and FIG. 9B is a SEM image of the exterior surface of the CNT metal composite material 100 related to the present example after the aging step. In addition, FIG. 9C is a low magnification SEM image of an interior cross-section when the CNT metal composite material 100 is divided parallel to the orientation direction of the CNT aggregate 10. In addition, FIG. 10A to FIG. 10C are SEM images of the vicinity of a fractured surface of the CNT metal composite material 100 that has been fractured.

It can be seen that innumerable metal particles are deposited on the exterior surface of the CNT metal composite material 110 before the aging step. On the other hand, it can be seen that the exterior surface of the CNT metal composite material 100 has been smoothed by the aging step. In addition, referring to FIG. 9C, in the interior cross-section of the CNT metal composite material 100, a structure is comprised in which CNTs 11 are uniformly deposited and metal 20 is dispersed, and it is difficult to distinguish the CNT 11 and the metal 20. It is clear that in CNT metal composite material 100 related to the present example, a region exists in which CNTs 11 are uniformly dispersed and metal 20 is deposited, the region having a length of at least 1 μm. This is because by performing the aging step, it is presumed that metal particles with a small allowable current density are reconstructed into large metal crystals having a large allowable current density, and the metal 20 is deposited in a state where CNTs 11 are uniformly distributed.

The CNT-metal composite material 100 was measured by Scanning Electron Microscopy and Energy Dispersive X-ray spectroscopy (SEM-EDAX). In the preset example, SEM images were taken with 20 kV operation voltages of using an environmental scanning electron microscope (manufactured by Hitachi High-Technologies), and an energy dispersion X-ray analysis (EDX) was performed using an EDAX analyzer (manufactured by HORIBA) while cooling a Si detector with liquid nitrogen. The EDX measurement results are shown in FIG. 11A to FIG. 11C. FIG. 11A is a SEM image of the CNT metal composite material 100. FIG. 11B is a diagram mapping the energy of Cu-Kα and C-Kα with respect to the SEM image in FIG. 11A, and the left side of FIG. 11C is a diagram showing mapping of Cu-Kα, and the right side is a diagram showing mapping of C-Kα. From these results, it was clear that the CNT metal composite material 100 related to the present example, in an elemental analysis magnified ten thousand times using EDX exists in a region in which a signal showing the appearance of copper and a signal showing the appearance of carbon are uniform, the length of the region being at least 1 μm.

Figure 12A:
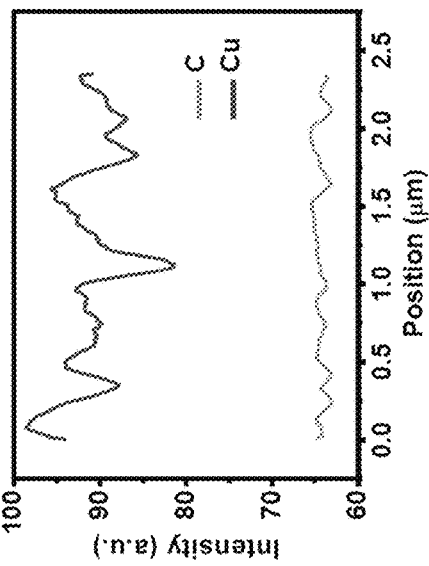
FIG. 12A is a SEM image of the CNT metal composite material 100.
Figure 12B:
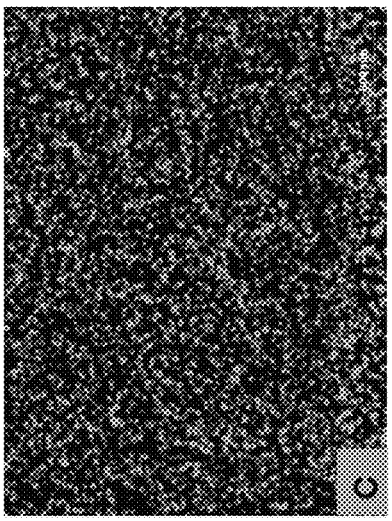
FIG. 12B is a diagram showing the results of line scanning an image mapping a peak derived from copper and carbon related to one example of the present invention.
Figure 12C:
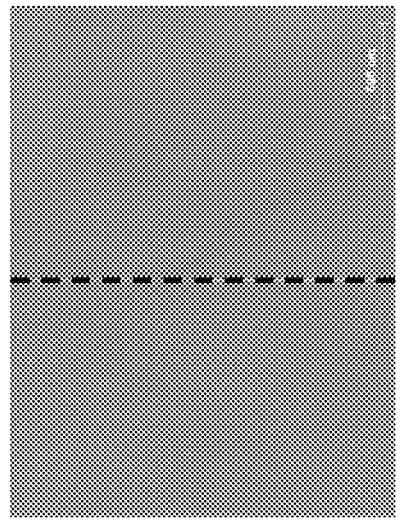
FIG. 12C is a view mapping Cu-Kα.
Figure 12D:
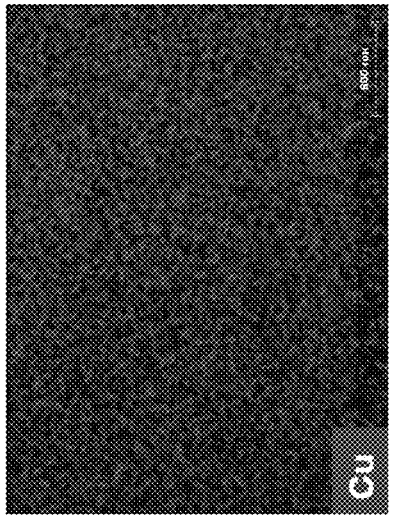
FIG. 12D is a view mapping C-Kα.

Next, uniformity of the distribution of copper and CNTs in the CNT metal composite material 100 was further verified. FIG. 12A to FIG. 12D are diagrams showing a line scan result of an image mapping a peak derived from copper and carbon. In FIG. 12A is a SEM image of the CNT metal composite material 100 and the dotted line in the figure shows a locus of the line scan. FIG. 12B is a diagram showing the results of line scan of FIG. 12C and FIG. 12D, FIG. 12C is a view mapping Cu-Kα, and FIG. 12D is a view mapping C-Kα. It is clear that the results show a uniform distribution with respect to the CNT metal composite material 900 in a comparative example shown in FIG. 14 and FIG. 15.

Figure 13A:
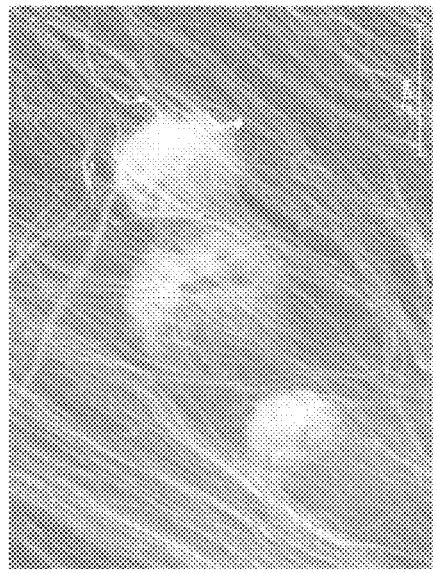
FIG. 13A is a SEM image of a CNT metal composite material 900 of a comparative example.
Figure 13B:
FIG. 13B is a SEM image of a CNT metal composite material 900 of a comparative example.
Figure 13C:
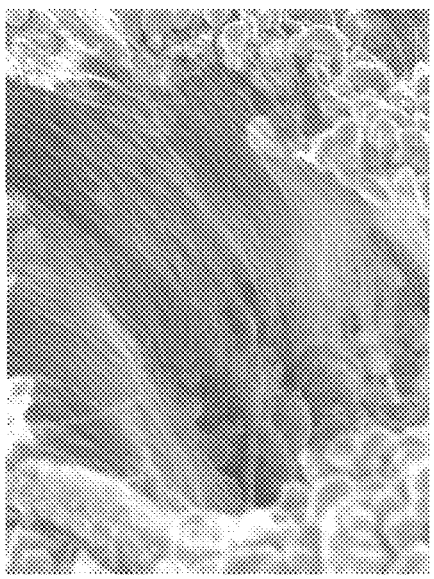
FIG. 13C is a SEM image of a CNT metal composite material 900 of a comparative example.

FIG. 13A to FIG. 13C are SEM images of the CNT metal composite material 900 of the comparative example in which an aging step has not been performed. In the comparative example in which an aging step has not been performed, it is possible to clearly identify the CNT 11 and copper particles. In addition, it is clear that deposition of copper particles is not uniform with respect to CNT 11.

Figure 14A:
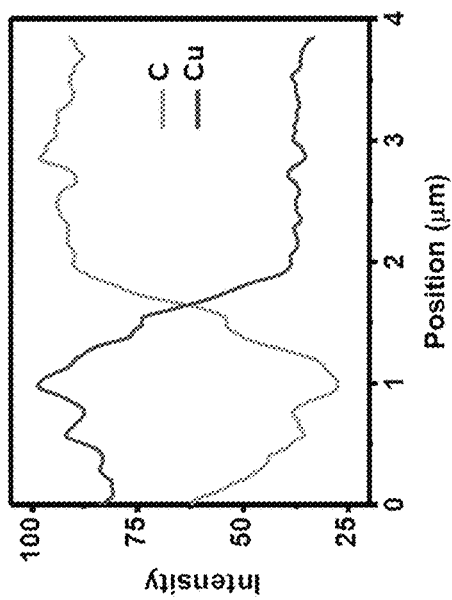
FIG. 14A is a SEM image of the CNT metal composite material 900 of a comparative example.
Figure 14B:
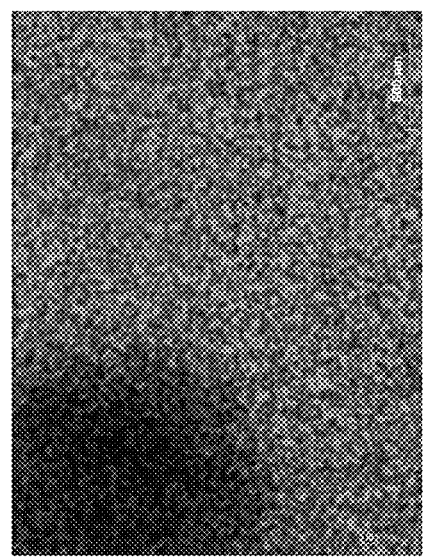
FIG. 14B is a diagram showing the results of line scanning an image mapping a peak derived from copper and carbon with respect to the CNT metal composite material 900 of a comparative example.
Figure 14C:
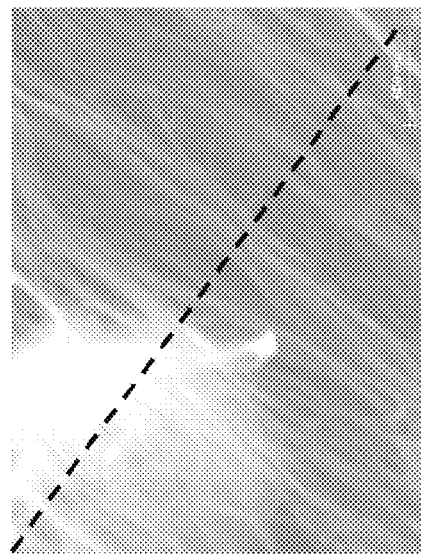
FIG. 14C is a view mapping Cu-Kα.
Figure 14D:
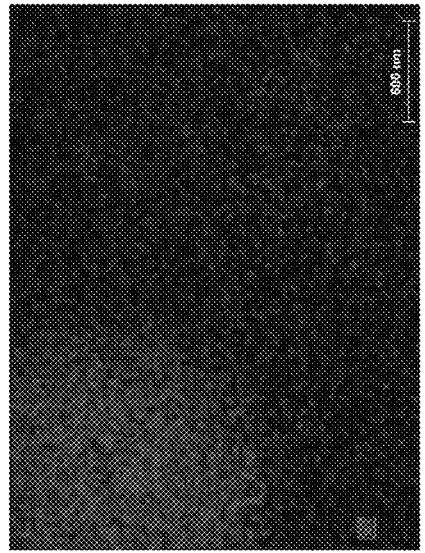
FIG. 14D is a view mapping of C-Kα.
Figure 15A:
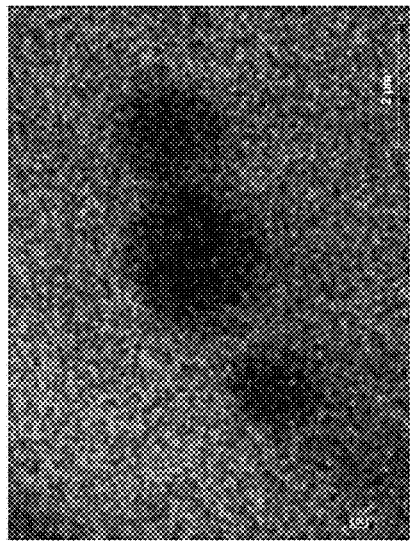
FIG. 15A is a SEM image of the CNT metal composite material 900 of a comparative example.
Figure 15B:
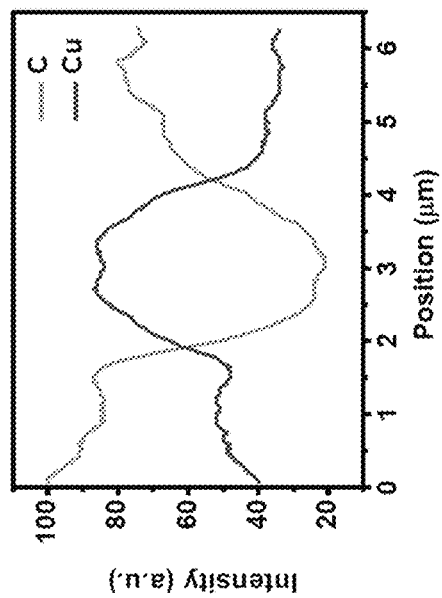
FIG. 15B is a diagram showing the results of line scanning an image mapping a peak derived from copper and carbon with respect to the CNT metal composite material 900 of a comparative example.
Figure 15C:
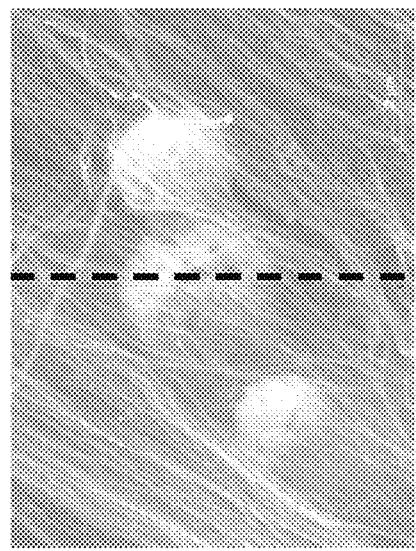
FIG. 15C is a view mapping Cu-Kα.
Figure 15D:
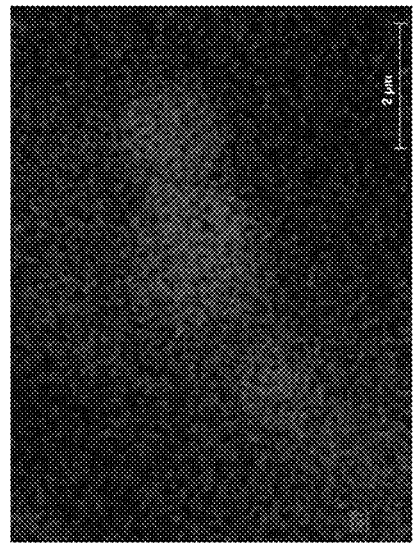
FIG. 15D is a view mapping of C-Kα.

FIG. 14A to FIG. 14D and FIG. 15A to FIG. 15D are images showing results of a line scan of an image mapping a peak derived from copper and carbon with respect to the CNT metal composite material 900 of the comparative example. FIG. 14A and FIG. 15A are SEM images of the CNT metal composite material 900 and the dotted line in the figure shows a locus of the line scan. FIG. 14B and FIG. 15B are diagrams showing the results of a line scan of FIG. 14C and FIG. 15C and FIG. 14D and FIG. 15D, FIG. 14C and FIG. 15C are views mapping Cu-Kα, and FIG. 14D and FIG. 15D are views mapping of C-Kα. As is clear from these results, in the CNT metal composite material 900 of the comparative example in which an aging step has not been performed, deposition of copper particles was not uniform with respect to CNT 11.

Figure 16A:
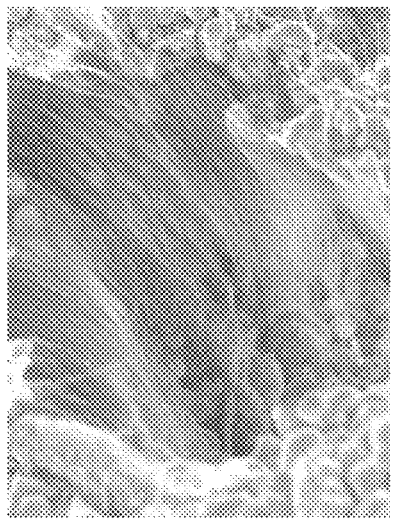
FIG. 16A is a SEM image of the CNT metal composite material 900 of a comparative example.
Figure 16C:
FIG. 16C is a diagram mapping peak derived from carbon on the SEM image with respect to the CNT metal composite material 900 of a comparative example.
Figure 16B:
FIG. 16B is a diagram mapping peak derived from copper on the SEM image with respect to the CNT metal composite material 900 of a comparative example.

FIG. 16A to FIG. 16C are diagrams mapping each peak derived from copper and carbon respectively in a SEM image with respect to the CNT metal composite material 900 of the comparative example. FIG. 16A is a SEM image of the CNT metal composite material 900, FIG. 16B is a diagram obtained by merging the mapping of Cu-Kα in FIG. 16A, and FIG. 16C is a diagram obtained by merging the mapping of the C-Kα in FIG. 16A. From these results, it is also clear that in the CNT metal composite 900 of the comparative example in which an aging step has not been performed, deposition of copper particles is not uniform with respect to the CNT 11.

Figure 17B:
FIG. 17B is a SEM image of a CNT metal composite material of one example of the present invention and a comparative example.
Figure 17A:
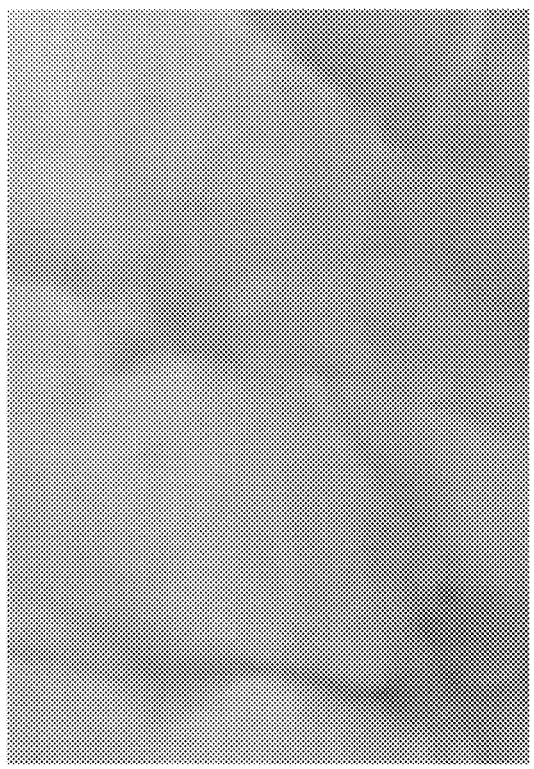
FIG. 17A is a SEM image of a CNT metal composite material of one example of the present invention and a comparative example.

Next, a histogram distribution of the signal intensity of Cu mapping a 1 μm square region was examined with respect to the CNT metal composite material 100 related to the present example and the CNT metal composite material 900 of the comparative example. FIG. 17A and FIG. 17B is a SEM image of the CNT metal composite materials of the Examples and Comparative Examples, FIG. 17A is a SEM image of the CNT metal composite material 100, and FIG. 17B is a SEM image of the CNT metal composite material 900. With respect to mapping of Cu-Kα, scanning was performed at 400 points and a histogram was created with respect to luminance.

Figure 18:
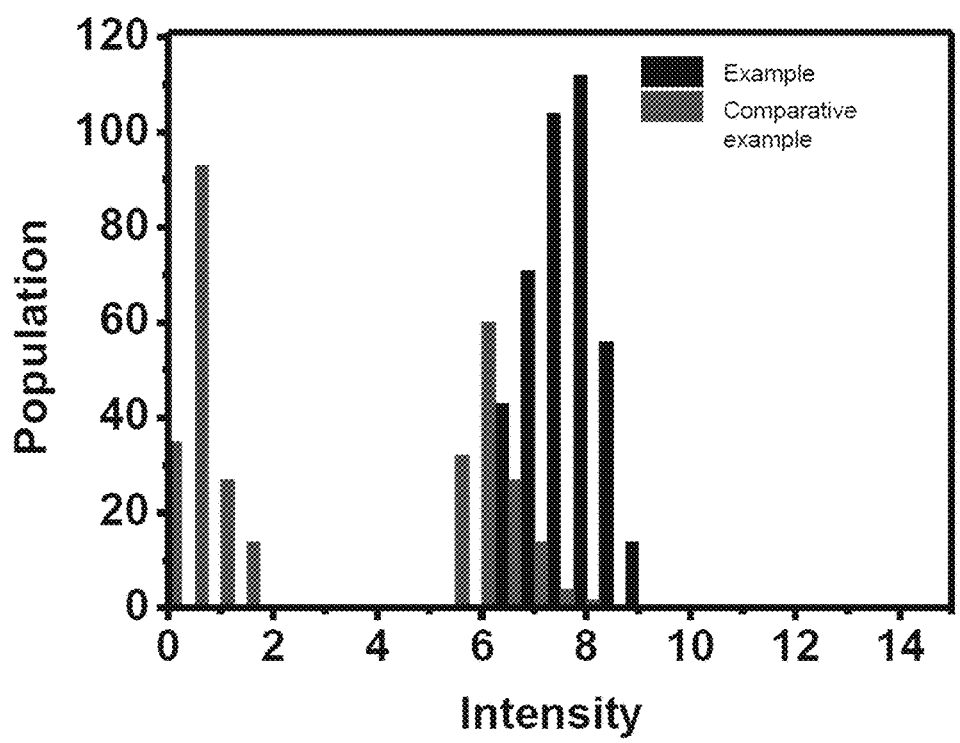
FIG. 18 is a diagram showing a histogram distribution of signal intensity of Cu mapped to a 1 µm square region of a CNT metal composite material related to one example of the present invention.

FIG. 18 is a diagram showing a histogram distribution of the signal intensity of Cu mapping a 1 μm square region with respect to FIG. 17. Since the CNT metal composite material 100 related to the present example comprises a region in which CNTs 11 are uniformly distributed and the metal 20 is deposited, the histogram distribution of the signal strength of metal showed one peak of maximum distribution value. On the other hand, in the CNT metal composite material 900 of the comparative example, since the metal 20 is attached non-uniformly to the CNT 11, multiple peaks of maximum distribution value occur.

Allowable current density was measured with respect to the CNT metal composite material 100 related to the present example. For this measurement, a T joint fitted with a connection terminal between both sides at one end was formed. A vacuum pump and a vacuum gauge were connected to an opening of the other end. The measurement was performed at a pressure of $1.3 \times 10^{-4}$ Pa. A connection terminal between both sides was connected to a U3606A DC power supply-Digital multimeter system manufactured by Agilent Co., Ltd., which can supply up to 3 A. A 10-105 DC power supply manufactured by Kikusui Co., Ltd was used for a larger current. The measurement was performed by increasing a voltage stepwise and simultaneously the current from the system was recorded. Resistance in a voltage phase calculated from each I-V correlation was converted into resistivity from the length and cross-sectional area of the specimen. The cross-sectional area was also used to calculate the current density applied at each step. The measurement was conducted five times and the same results were obtained. As a comparative example, a measurement was performed using the same steps and the same conditions with respect to a Cu film sputtered and electroplated, Cu and Au wires (diameter 25 μm) commonly used in wire bonding.

Figure 19:
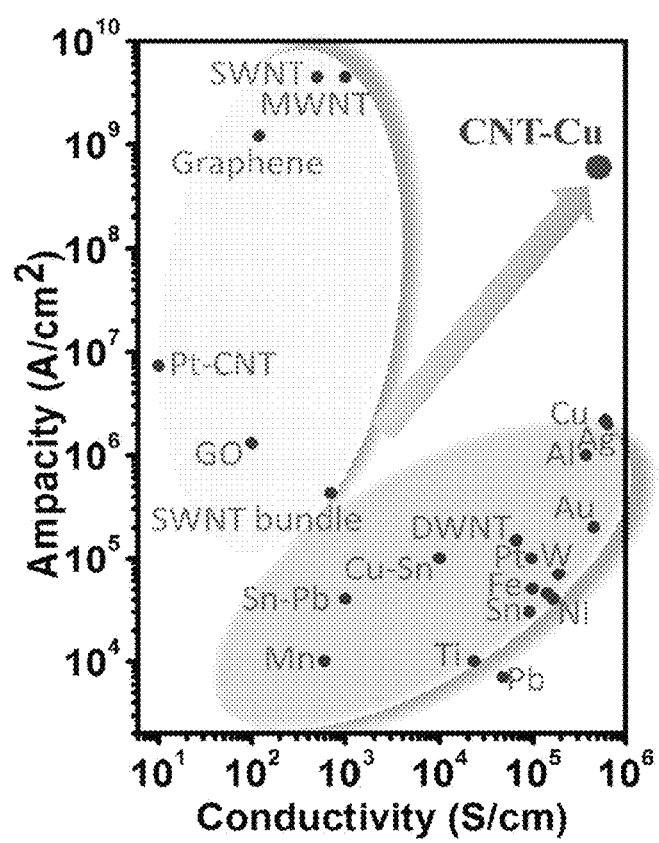
FIG. 19 is a diagram summarizing a relationship of allowable current density with respect to electrical conductivity related to one example of the present invention.

In addition, electrical conductivity was measured by a four terminal method with respect to the CNT metal composite material 100 related to the present example. A four terminal conductivity measuring device connecting to an Au coated electrode was used. The relationship of allowable current density with respect to electric conductivity is summarized in FIG. 19. A reverse trend between electric conductivity and an allowable current was clear in a material having high conductivity and a nano-carbon having a high allowable current. The CNT metal composite material 100 related to the present example does not follow this trend but shows a 1000 times higher conductivity than the nano-carbon and 100 times higher permissible current than those materials, and different points were formed in a domain between a high allowable current and high conductivity domains. To date, materials for improving both properties at the same time have not been realized, for example, conductivity in a copper alloy is reduced, and CNTs which are doped or bundled reduce an allowable current.

Figure 20:
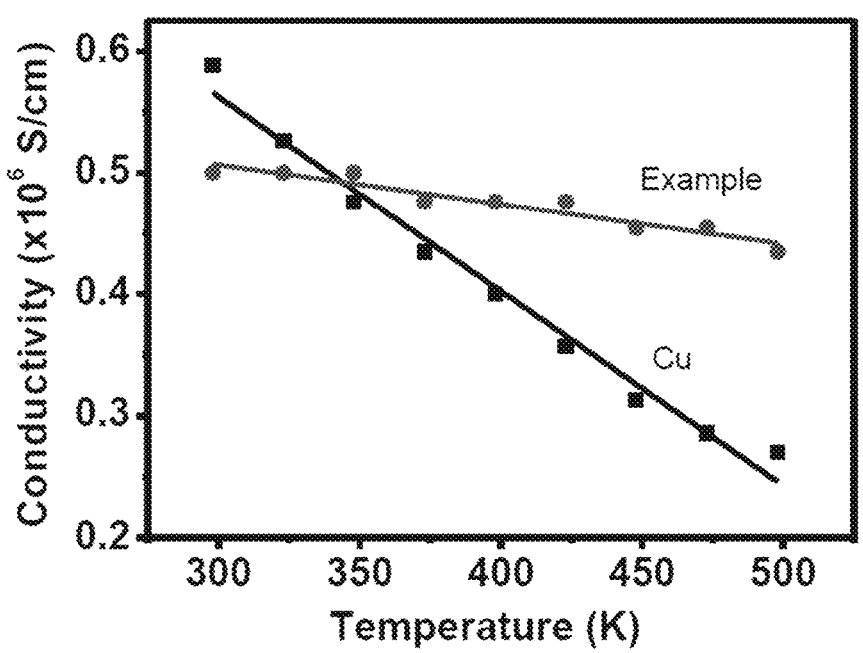
FIG. 20 is a diagram showing a relationship between temperature and electric conductivity of the CNT metal composite material 100 related to one example of the present invention.

FIG. 20 is a diagram showing the relationship between temperature and electric conductivity. The CNT metal composite material 100 related to the present example was $4.7 \times 10^5$ S/cm at room temperature. This is roughly comparable to $5.8 \times 10^5$ S/cm of copper. When the temperature was increased, the electrical conductivity change of the CNT metal composite material 100 was small compared to copper, and the electrical conductivity was higher than the electrical conductivity of copper at 80° C., and twice that of copper at 227° C.

Figure 21:
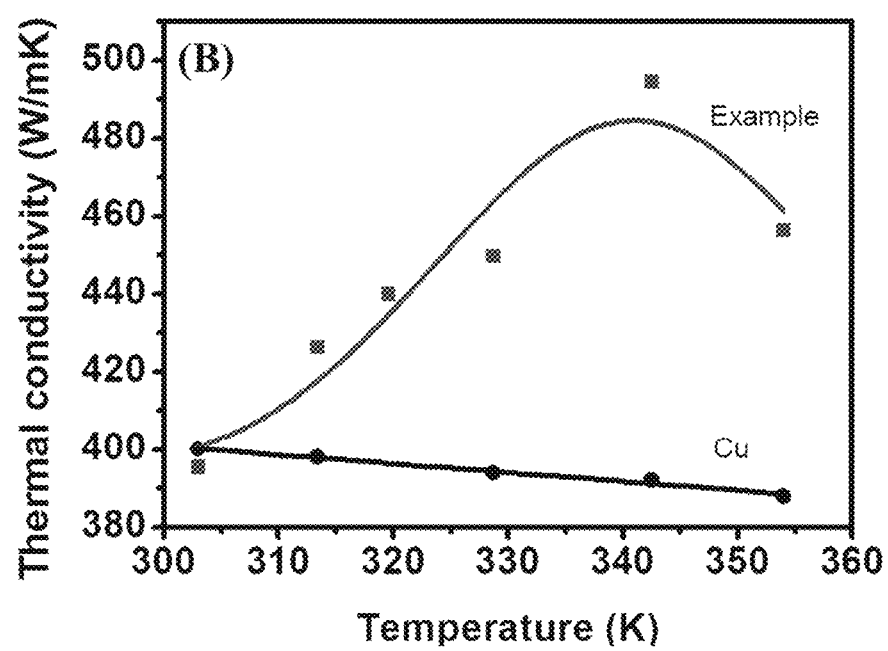
FIG. 21 is a diagram showing a relationship between temperature and thermal resistivity of the CNT metal composite material 100 related to one example of the present invention.

In FIG. 21, a relationship between temperature and volume resistivity is shown. In a temperature range from 320K to 350K, the CNT metal composite material 100 was higher than thermal conductivity at room temperature, and showed the opposite behavior to Cu alone.

Figure 22:
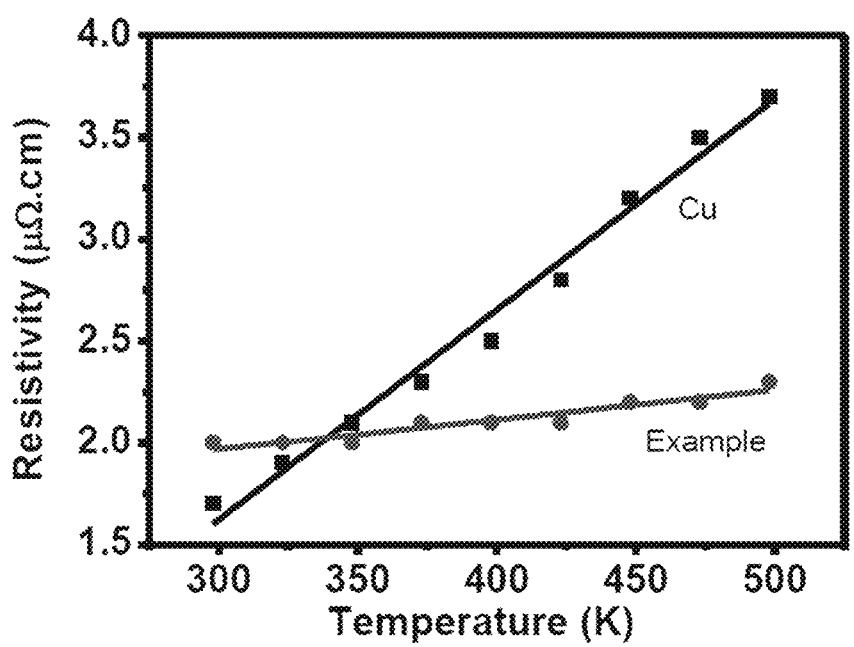
FIG. 22 is a diagram showing a relationship between temperature and volume resistivity of the CNT metal composite material 100 related to one example of the present invention.

In FIG. 22, a relationship between temperature and volume resistivity is shown. While a temperature coefficient of resistivity (TCR) of the CNT metal composite 100 was $7.5 \times 10^{-4}$/K, TCR in the Cu alone was $6.8 \times 10^{-3}$/K. In a temperature range from 320K to 500K, the CNT metal composite material 100, in comparison to Cu alone, had a significantly suppressed increase in resistivity with an increase in temperature.

Figure 23:
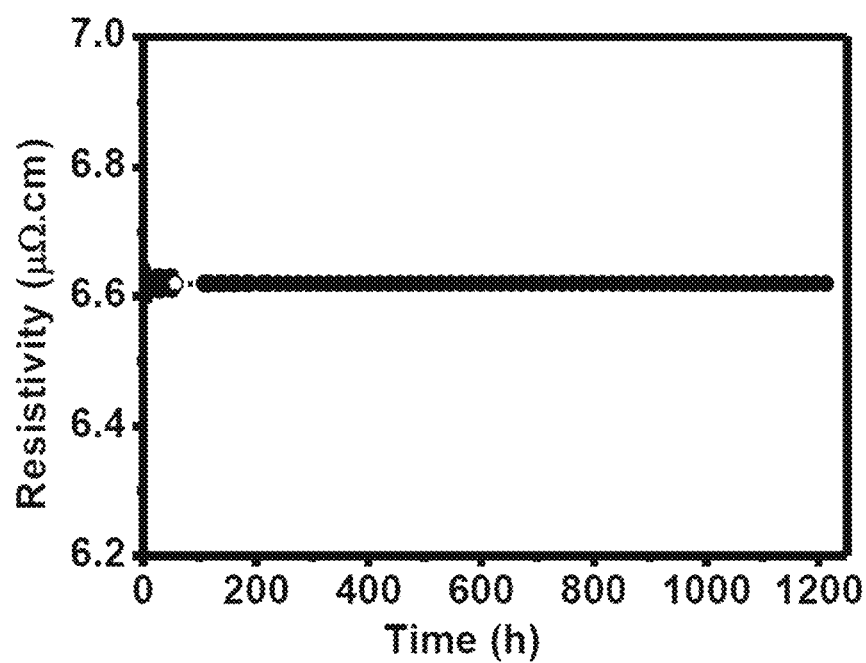
FIG. 23 is a diagram showing a relationship between aging time and volume resistivity of the CNT metal composite material 100 related to one example of the present invention.
Figure 24:
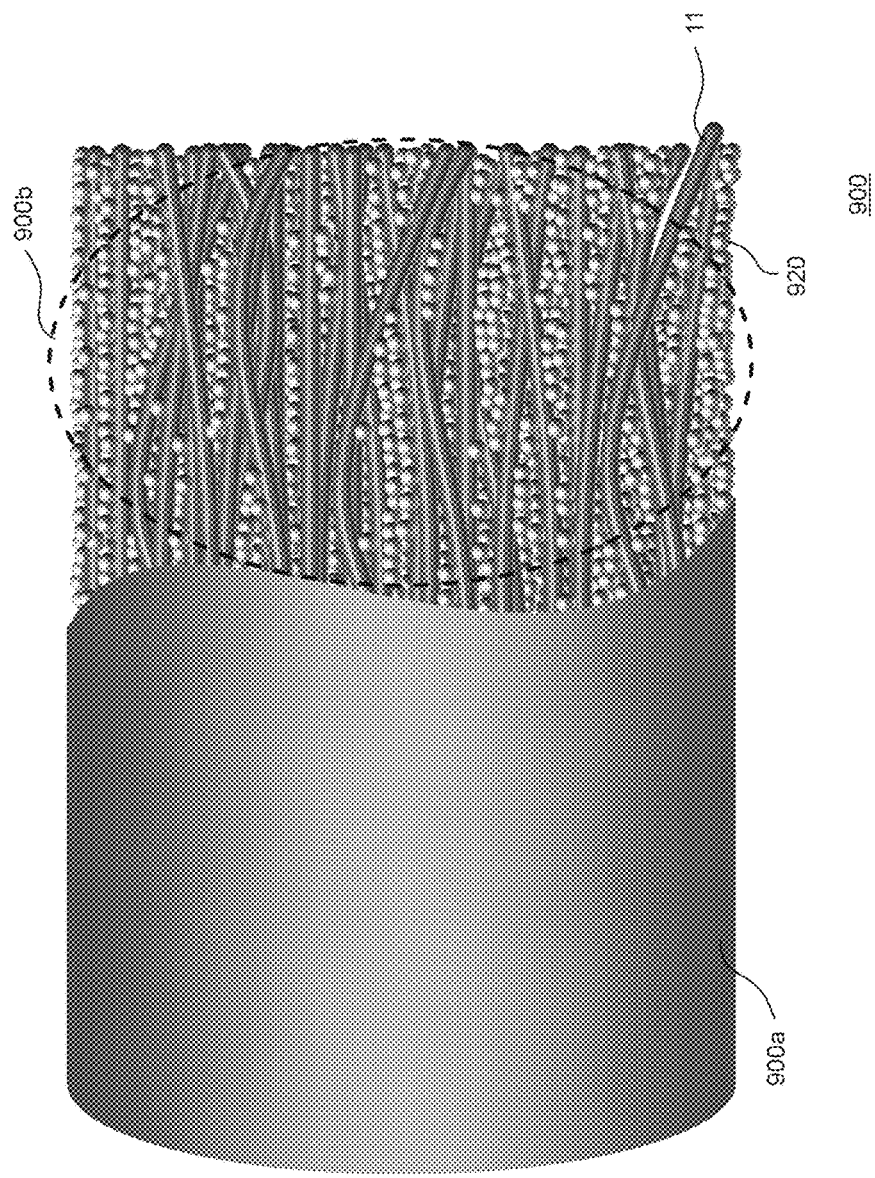
FIG. 24 is a schematic diagram of the CNT metal composite material 900 of a comparative example.

A relationship between aging time and volume resistivity is shown in FIG. 23. The aging results are shown at $150 \times 10^6$ A/cm². The volume resistivity was constant up to 1200 hours. From this result it was clear that the CNT metal composite material 100 related to the present example has excellent durability with respect to a large allowable current density.

According to the present invention, a CNT metal composite material and a producing method thereof is provided which is lightweight, has high electrical conductivity and high electrical capacity, and furthermore has high electrical conductivity even at high temperatures.

The invention claimed is:

1. A carbon nanotube (CNT) metal composite material comprising:
   a CNT aggregate including a plurality of CNTs, the CNT aggregate depositing a metal, the metal being deposited on an exterior surface of the CNT aggregate and an interior of the CNT aggregate,
   wherein the CNT metal composite material has a region existing with a length of at least 1 μm, and a signal of the metal and a signal of carbon derived from the plurality of CNTs are uniformly distributed in the region in a two-dimensional elemental analysis image magnified ten thousand times using an energy dispersion X-ray analysis, or
   the CNT metal composite material has a single peak of maximum distribution value in a histogram distribution of signal strengths of the metal mapping a 1 μm square region in a two-dimensional elemental analysis magnified ten thousand times using the energy dispersion X-ray analysis wherein the metal is copper, and an intensity ratio between the largest intensity peak attributed to copper and the largest intensity peak attributed to copper oxide of the metal is 10 or more when an X-ray diffraction analysis of an internal cross-section of the CNT metal composite material is performed using a Cu—Kαray as a radiation source.

2. The CNT metal composite material according to claim 1, wherein the CNT metal composite material has an allowable current density is at $6 \times 10^6$ A/cm² or more.

3. The CNT metal composite material according to claim 1, wherein the CNT metal composite material has a volume resistivity of $1 \times 10^{-6}$ Ω·cm or more and $5 \times 10^{-3}$ Ω·cm or less.

4. The CNT metal composite material according to claim 1, wherein the CNT metal composite material has a matrix structure, and
   a part of the plurality of CNTs assemble locally and another part of the plurality of CNTs separate locally in the matrix structure.

5. The CNT metal composite material according to claim 1, wherein the CNT metal composite material includes a CNT having a pore size distribution maximum of 50 nm or less.

6. The CNT metal composite material according to claim 1, wherein the CNT metal composite material includes the plurality of CNTs of 3 wt % or more of total CNT metal composite material.

7. The CNT metal composite material according to claim 1, wherein the CNT metal composite material has a 20% or more of volume content ratio of copper.

\* \* \* \* \*